United States Patent
Shiao

(10) Patent No.: US 10,463,112 B2
(45) Date of Patent: Nov. 5, 2019

(54) METHOD FOR MANUFACTURING SHOE BODY AND APPARATUS FOR UTILIZING THE METHOD

(71) Applicant: DAH LIH PUH CO., LTD., Taichung (TW)

(72) Inventor: Jui-Fen Shiao, Taichung (TW)

(73) Assignee: DAH LIH PUH CO., LTD., Taichung (TW)

( * ) Notice: Subject to any disclaimer, the term of this patent is extended or adjusted under 35 U.S.C. 154(b) by 98 days.

(21) Appl. No.: 15/940,322

(22) Filed: Mar. 29, 2018

(65) Prior Publication Data

US 2019/0298005 A1  Oct. 3, 2019

(51) Int. Cl.
| | |
|---|---|
| A43D 11/00 | (2006.01) |
| A43D 25/20 | (2006.01) |
| B32B 25/08 | (2006.01) |
| B32B 25/20 | (2006.01) |
| A43D 11/03 | (2006.01) |
| A43B 1/10 | (2006.01) |
| A43B 1/14 | (2006.01) |

(52) U.S. Cl.
CPC ............ *A43D 11/003* (2013.01); *A43D 11/00* (2013.01); *A43D 11/03* (2013.01); *A43D 25/20* (2013.01); *B32B 25/08* (2013.01); *B32B 25/20* (2013.01); *A43B 1/10* (2013.01); *A43B 1/14* (2013.01); *B32B 2437/02* (2013.01)

(58) Field of Classification Search
CPC ...... A43D 11/00; A43D 11/003; A43D 11/03; A43D 11/12; A43D 11/14; A43D 25/20

USPC .......................... 12/61 R, 61 A, 64, 66, 61 B
See application file for complete search history.

(56) References Cited

U.S. PATENT DOCUMENTS

| | | | | |
|---|---|---|---|---|
| 2,447,681 | A * | 8/1948 | Beckwith | A43B 23/16 12/146 D |
| 3,316,573 | A * | 5/1967 | Chaplick | A43D 11/00 12/146 D |
| 3,442,743 | A * | 5/1969 | Dziki | A43D 11/00 156/245 |
| 4,266,312 | A * | 5/1981 | Hall | A43D 25/00 12/146 C |
| 4,734,150 | A * | 3/1988 | Morse | A43D 11/00 156/578 |
| 7,758,713 | B2 * | 7/2010 | Morlacchi | A43B 7/125 12/142 R |

(Continued)

*Primary Examiner* — Marie D Bays
(74) *Attorney, Agent, or Firm* — Tracy Heims; Apex Juris, pllc.

(57) ABSTRACT

A method for manufacturing a shoe body, comprising the following steps: overlap and fix a tensile film and a composite material film; move a vamp having a three-dimensional shape to make a surface of the vamp abutting against the composite material film, so that both of the tensile film and the composite material film have a predetermined tension; heat the composite material film in a contactless manner, so that the composite material film is joined to the surface of the vamp; move the tensile film away from the composite material film. An apparatus for utilizing such method includes a fixture which is adapted to fix the tensile film and the composite material film; a fixing member which is adapted to support the vamp; a driving device which is adapted to drive the fixing member or the fixture; a contactless heating device which is adapted to heat the composite material film.

20 Claims, 24 Drawing Sheets

(56) References Cited

U.S. PATENT DOCUMENTS

| | | | |
|---|---|---|---|
| 8,162,022 B2 * | 4/2012 | Hull | A43D 95/14 156/382 |
| 8,821,669 B2 * | 9/2014 | Morlacchi | A43B 7/125 156/214 |
| 2003/0115679 A1 * | 6/2003 | Morlacchi | A43B 7/12 8/115.51 |
| 2006/0123567 A1 * | 6/2006 | Morlacchi | A43B 7/125 12/142 R |
| 2010/0065592 A1 * | 3/2010 | Fard | A43B 3/106 223/113 |

* cited by examiner

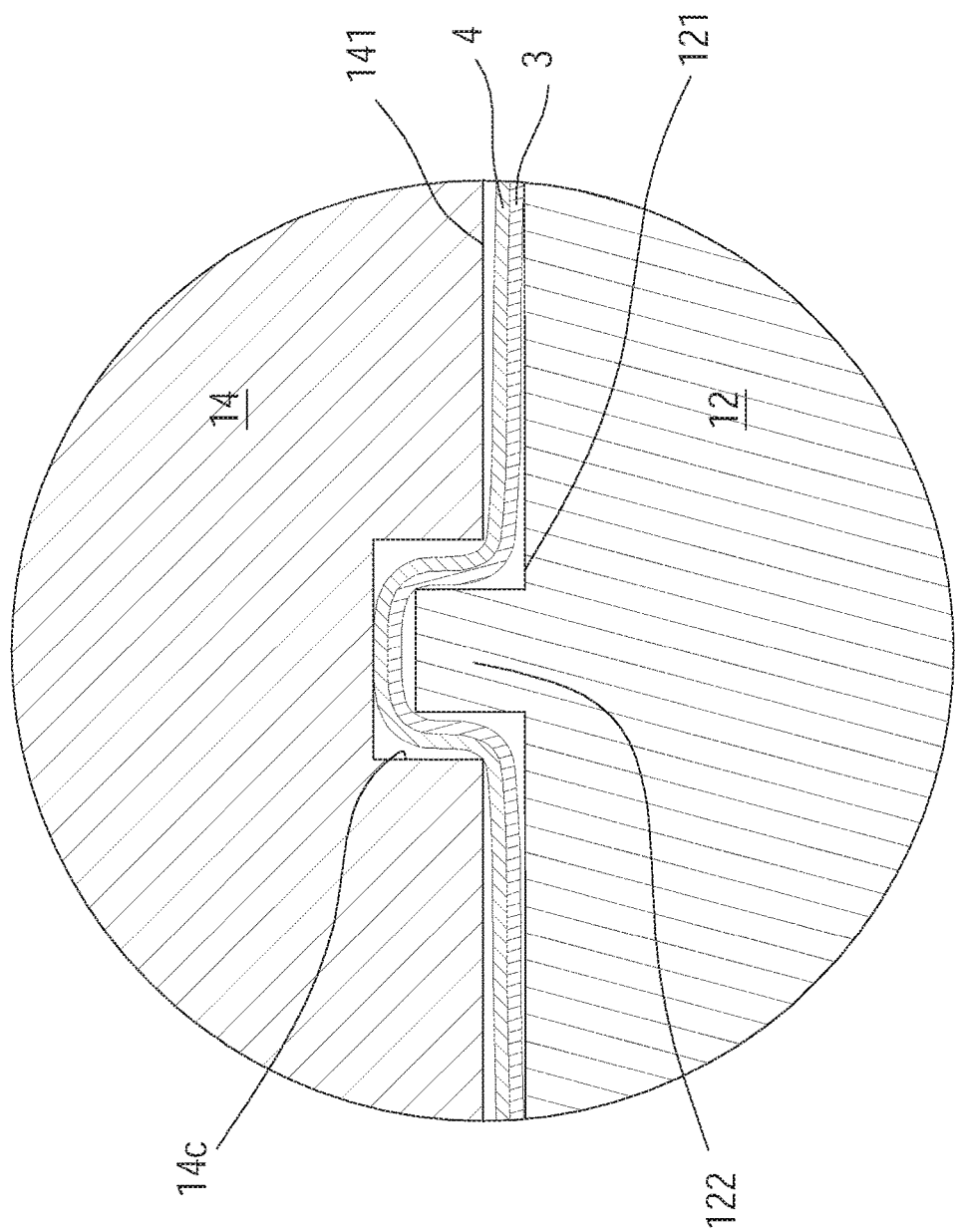
F.I.G. 17

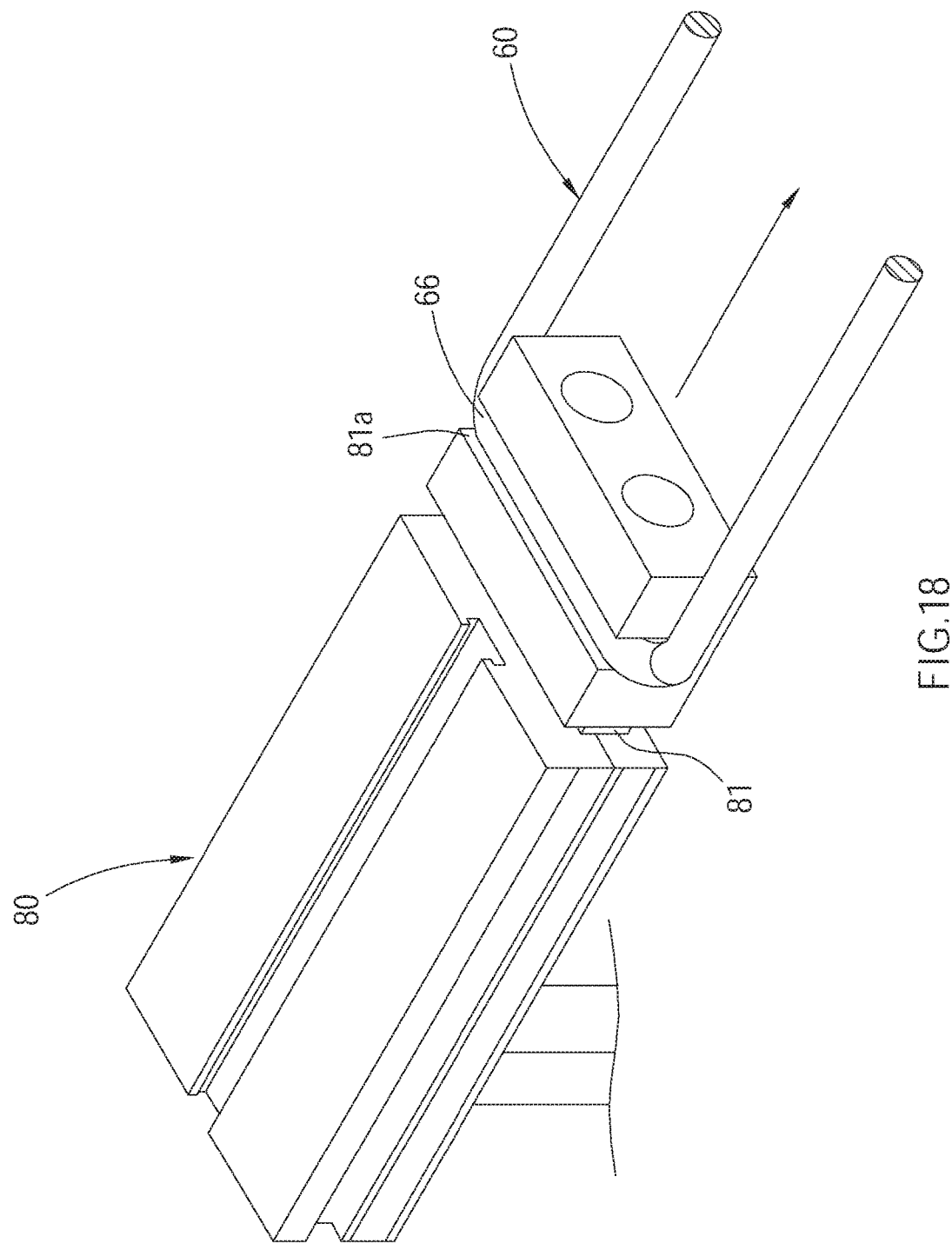

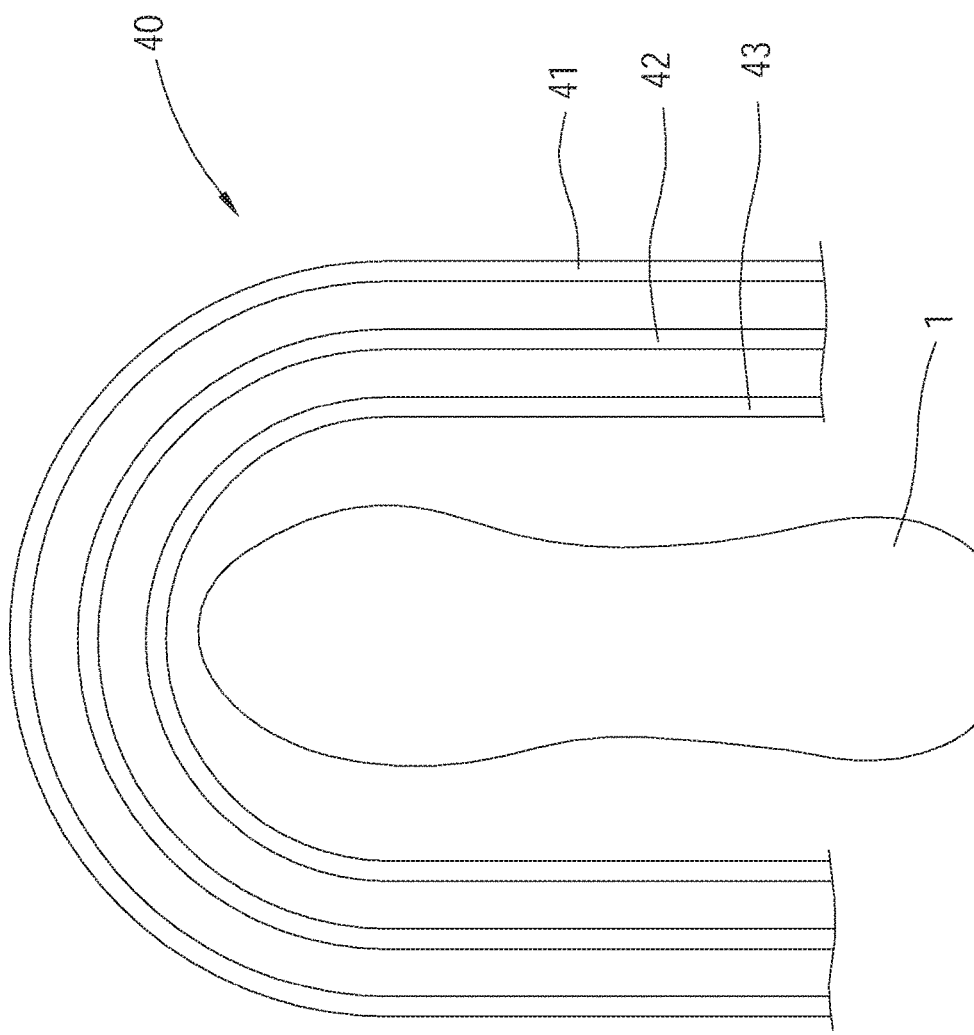

METHOD FOR MANUFACTURING SHOE BODY AND APPARATUS FOR UTILIZING THE METHOD

BACKGROUND OF THE INVENTION

1. Technical Field

The present invention relates generally to a shoe body process, and more particularly to a method for manufacturing a shoe body and an apparatus for utilizing the method.

2. Description of Related Art

Typically, a shoe includes a shoe body and a sole, wherein the sole is adapted to contact the ground. The shoe body is fixed on the sole, and could extend around the ankle, the instep, and the toes of a user, whereby to protect the foot of the user.

In order to provide a better protection of the toes and to provide a better resistance to abrasions, the conventional shoes are usually provided with a protective sheet which is sewn to the shoe body. However, such a manual sewing method may cause the protective sheet to warp and peel off due to the breakage of the suture. In addition, the professional sewing manpower is more and more difficult to find, so that the cost used in manually operated products would be much higher.

In order to solve such problem, a method for manufacturing a shoe body without sewing the protective sheet has been developed, wherein the method includes heating a composite material film to make the composite material film being attached to a vamp which is planar. Then, the vamp covered with the composite material film is processed to be a three-dimensional shape, whereby to be combined with the sole. In this way, the shoe body with a protective sheet formed by heating the composite material film is completed without sewing.

However, the shoe body made by the above manner still has a disadvantage that the protective sheet attached to the vamp is easily wrinkled during processing. Also, the shape of the protective sheet and the position of the vamp on which the protective sheet is attached could not be adjusted to meet various requirements, which not only affect the appearance of the shoe, but also affect the comfort of the user while wearing it. In all aspects, the conventional method for manufacturing a shoe body still has room for improvements.

BRIEF SUMMARY OF THE INVENTION

In view of the above, the objective of the present invention is to provide a method for manufacturing a shoe body and an apparatus for utilizing the method, whereby the composite material film could adhere to the vamp having a three-dimensional shape so as to form a protective layer thereon without sewing. In this way, the sewing time of the shoe body could be saved, the manpower could be saved, and the formed protective layer could have a smooth surface without wrinkles. Therefore, the footwear made by such method could have a better appearance, and could improve the comfort for users while wearing the footwear.

The present invention provides a method for manufacturing a shoe body, wherein the shoe body is a part of a shoe and is adapted to be combined with a sole to form the shoe. The shoe body has a vamp having a three-dimensional shape and a protective layer which is adhered to at least a part of a surface of the vamp. The protective layer is made of composite material which is different from a material of the vamp. The method is adapted to adhere the protective layer on the vamp, including steps of A. prepare a tensile film and a composite material film, wherein the tensile film is extensible; B. overlap the tensile film and the composite material film, and fix at least two opposite lateral edges or two adjacent lateral edges of both the tensile film and the composite material film at the same time; C. move the vamp to press the composite material film with at least part of the surface of the vamp, alternatively, move the tensile film and the composite material film which are overlapped in step B to press at least part of the surface of the vamp with the composite material film, so that both of the tensile film and the composite material film have a predetermined tension; D. heat the composite material film in a contactless manner at a predetermined temperature for a predetermined time, so that the composite material film is joined to at least part of the surface of the vamp; E. move the tensile film away from the composite material film.

The present invention provides an apparatus for utilizing the method, wherein the apparatus includes a fixture, a fixing member, a driving device, and a contactless heating device. The fixture includes a first body and a second body, wherein the first body has a first surface, and the second body has a second surface. The first body and the second body are operable to make the first surface abutting against the second surface, whereby to fix at least two opposite lateral edges or at least two adjacent lateral edges of both of the tensile film and the composite material film. The fixing member is adapted to support the vamp. The driving device is adapted to drive the fixing member or the fixture, whereby to make at least a part of the surface of the vamp abutting against the composite material film, alternatively, to make the composite material film abutting against at least a part of the surface of the vamp. The contactless heating device is adapted to heat the composite material film.

By fixing at least two opposite lateral edges or two adjacent lateral edges of both the tensile film and the composite material film, when the surface of the vamp abuts against the composite material film, both of the tensile film and the composite material film have a predetermined tension. Therefore, when the composite material film is heated, the tensile film maintains the composite material film to fit perfectly on the vamp having a three-dimensional shape, reducing the wrinkles.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 6b is similar to FIG. 6a;

FIG. 16b is similar to FIG. 16a;

FIG. 17 is a sectional view, showing partial components of the apparatus of the second embodiment;

FIG. 18 is a perspective view, showing partial components of the apparatus of the second embodiment;

FIG. 19 is a schematic diagram, showing partial components of the apparatus of the second embodiment;

DETAILED DESCRIPTION OF THE INVENTION

Figure 1:
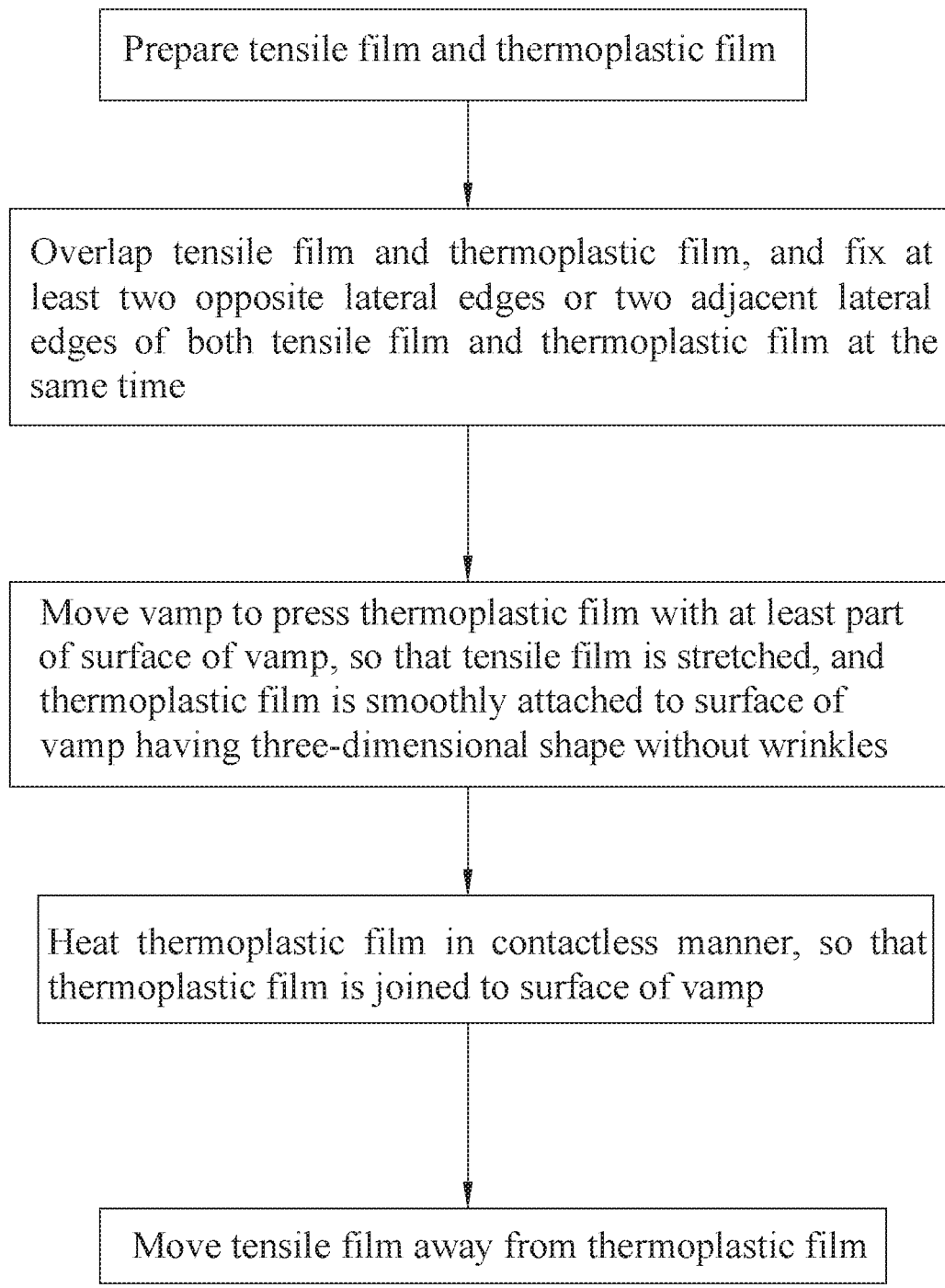
FIG. 1 is a flowchart of the method for manufacturing a shoe body according to a first embodiment of the present invention.

A flowchart of a method for manufacturing a shoe body according to a first embodiment of the present invention is illustrated in FIG. 1, wherein the shoe body has a vamp which has a three-dimensional shape, and the shoe body could be combined with a sole to form a shoe. The method is adapted to cover a protective layer on the vamp, wherein the method includes the following steps.

A. preparing a tensile film and a composite material film, wherein the tensile film is extensible. In the current embodiment, the tensile film is made of flexible materials having flexibility, such as silicone rubber, and the composite material film is a thermoplastic polyurethane (TPU) as an example. However, the tensile film is not limited to be silicone rubber, and the composite material film is not limited to be thermoplastic polyurethane.

B. overlapping the tensile film and the composite material film, and fixing at least two opposite lateral edges or two adjacent lateral edges of both the tensile film and the composite material film at the same time.

C. moving the vamp to press the composite material film with at least part of a surface of the vamp, so as to make both of the tensile film and the composite material film have a predetermined tension. In other embodiments, the composite material film could press at least part of the surface of the vamp by moving the tensile film and the composite material film which are overlapped in step B.

In order for the composite material film to be tightly attached to the vamp, in other embodiments, the method could further include a step of pressing the two opposite lateral edges or the two adjacent lateral edges between the vamp and both of the tensile film and the composite material film after step C.

D. heating the composite material film in a contactless manner, for instance, by electric heating, by roasting, or by infrared ray irradiation, at a predetermined temperature for a predetermined time, so that the composite material film is joined to at least part of the surface of the vamp, wherein the predetermined temperature and the predetermined time are slightly different depending on the heating method and the ambient temperature, as long as the composite material film could be melted to be a molten state after being heated.

The material property of the composite material film is that when the composite material film is heated to be the molten state, the composite material film could be re-plasticized. Therefore, after the composite material film is heated, the composite material film could be attached to a surface of the vamp. In addition, since the tensile film has the predetermined tension, a surface of the melted composite material film which is adjacent to the tensile film could be formed as a smooth surface without wrinkles when the melted composite material film is cooled.

E. moving the tensile film away from the composite material film, so as to obtain the shoe body having the composite material film, and the composite material film forms the protective layer.

With the aforementioned method, the manpower of sewing the protective layer could be saved, lowering the manufacturing cost. In addition, since the protective layer is directly formed on the vamp having a three-dimensional shape, the protective layer could be smooth without wrinkles, which not only provides a better appearance but also improve the comfort for users while wearing the footwear.

Figure 2:
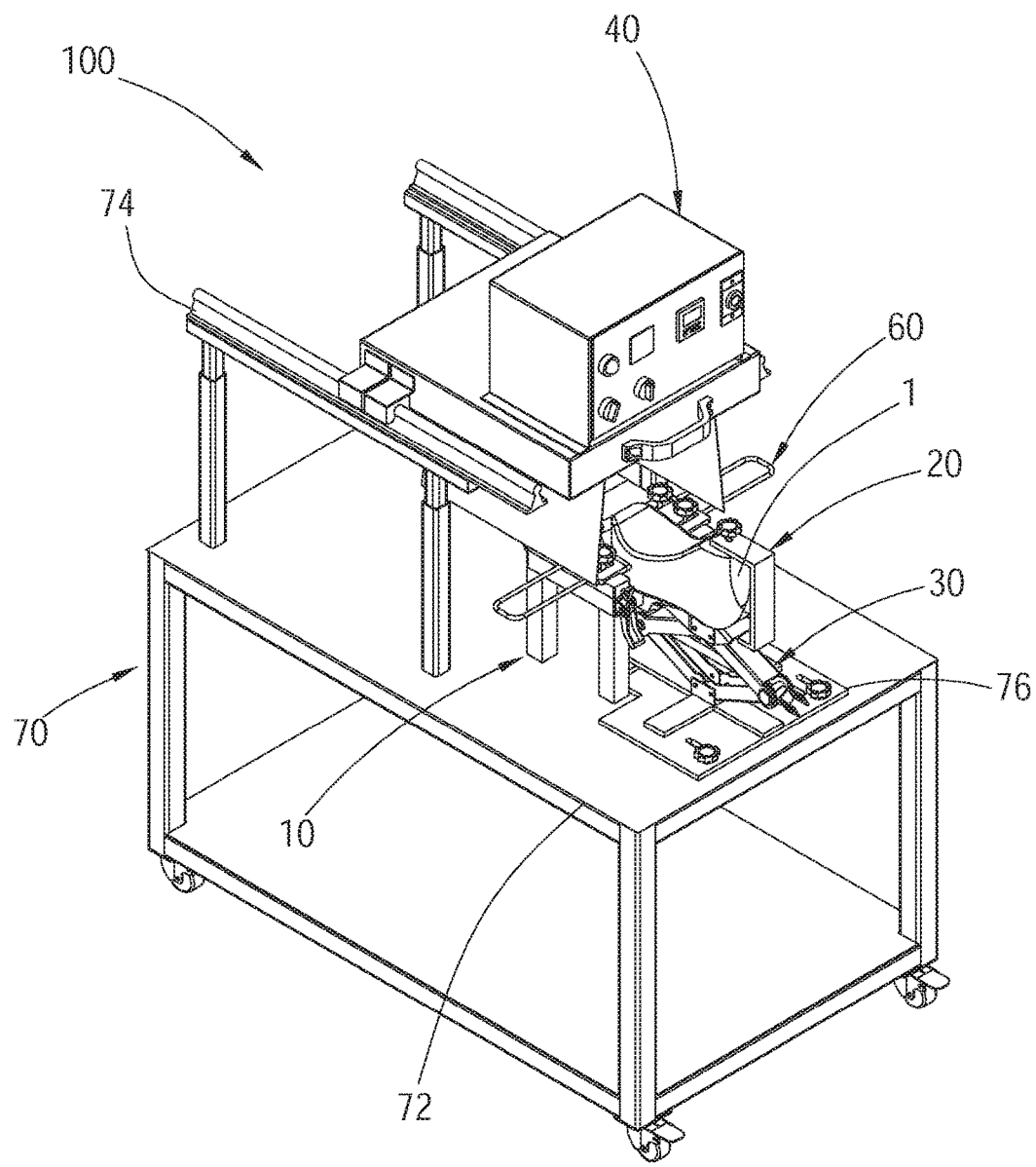
FIG. 2 is a perspective view of the apparatus for manufacturing a shoe body of the first embodiment of the present invention.

In the aforementioned paragraphs, detailed steps of the method for manufacturing the shoe body according to the first embodiment of the present invention are explained, while an apparatus 100 for utilizing such method will be described in detail herein. As shown in FIG. 2, the apparatus 100 includes a fixture 10, a fixing member 20, a driving device 30, and a contactless heating device 40, wherein the fixing member 20 is adapted to fix the vamp.

Figure 3:
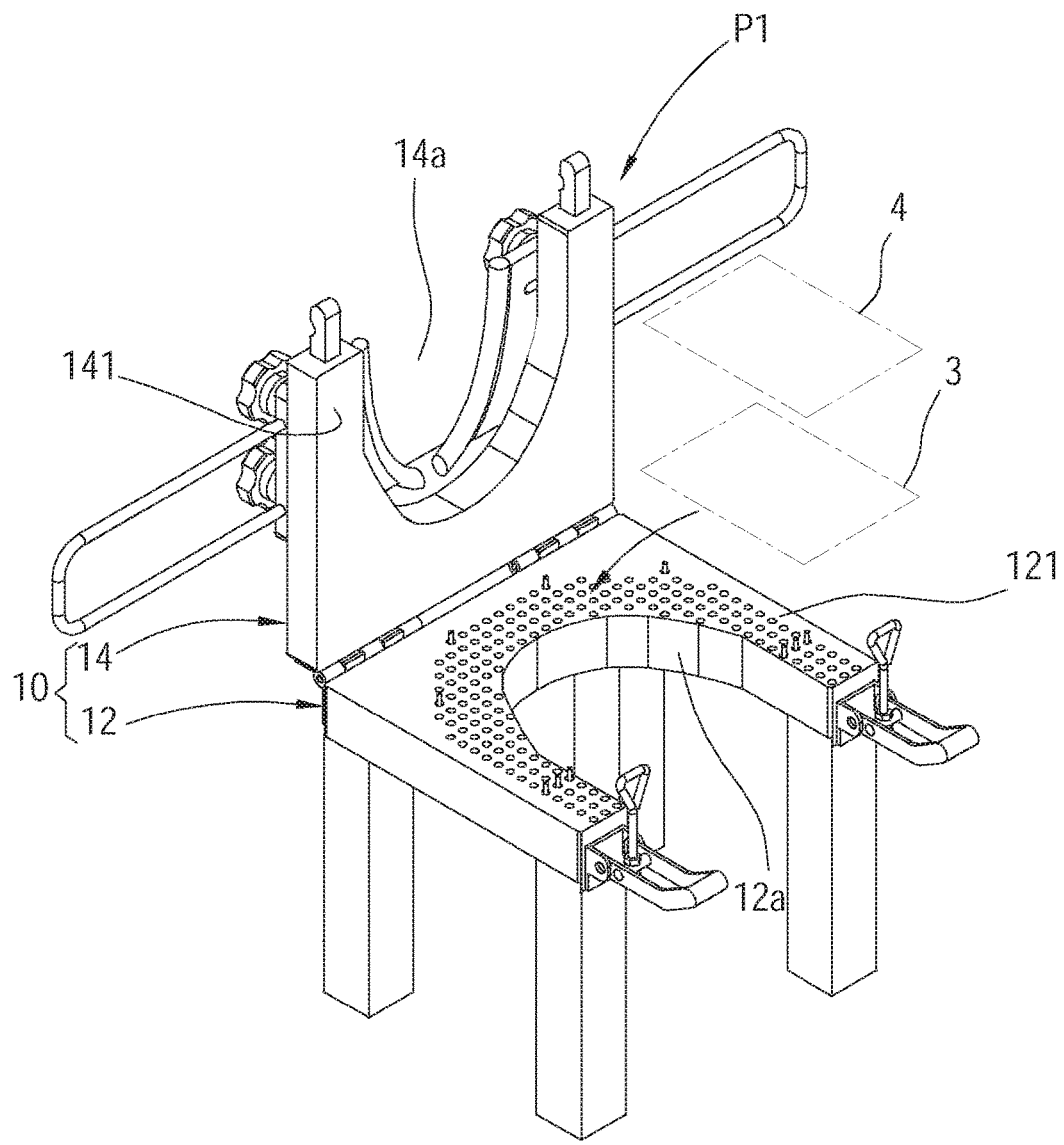
FIG. 3 is a perspective view, showing partial components of the apparatus of the first embodiment.
Figure 4:
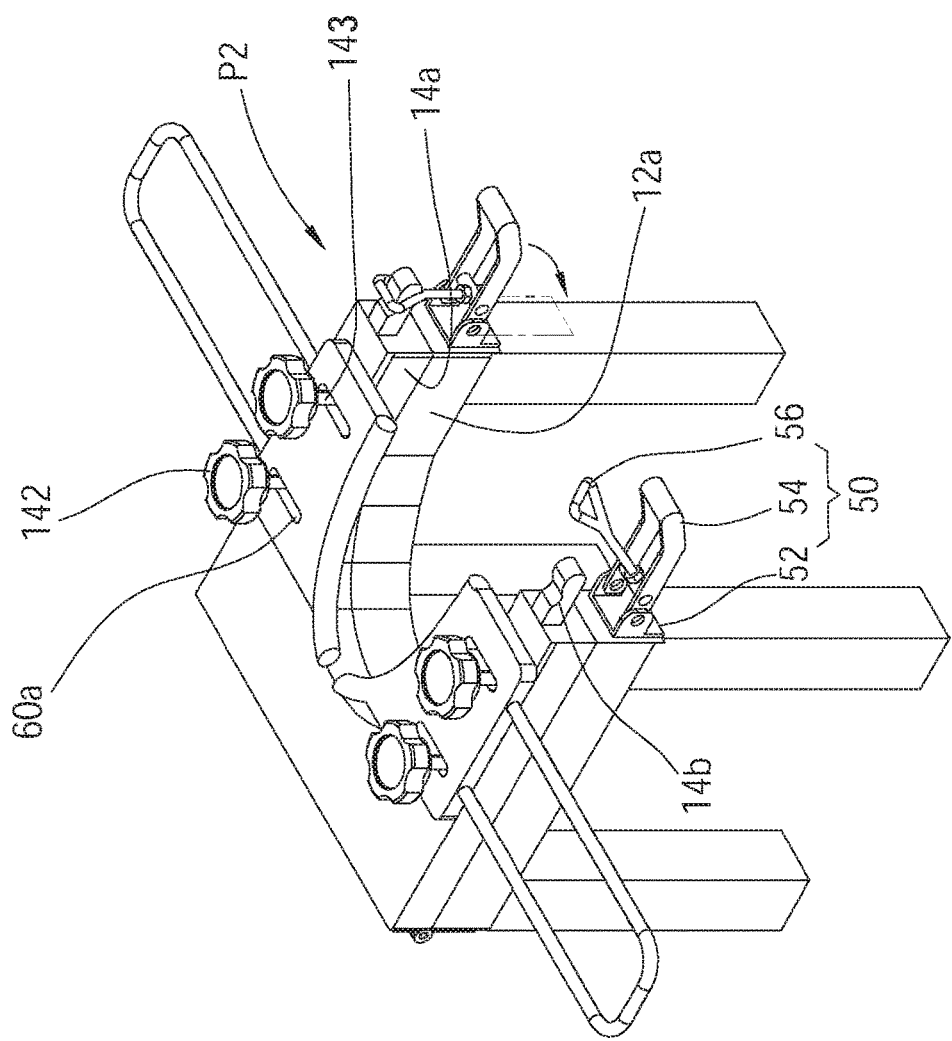
FIG. 4 is similar to FIG. 3.
Figure 5:
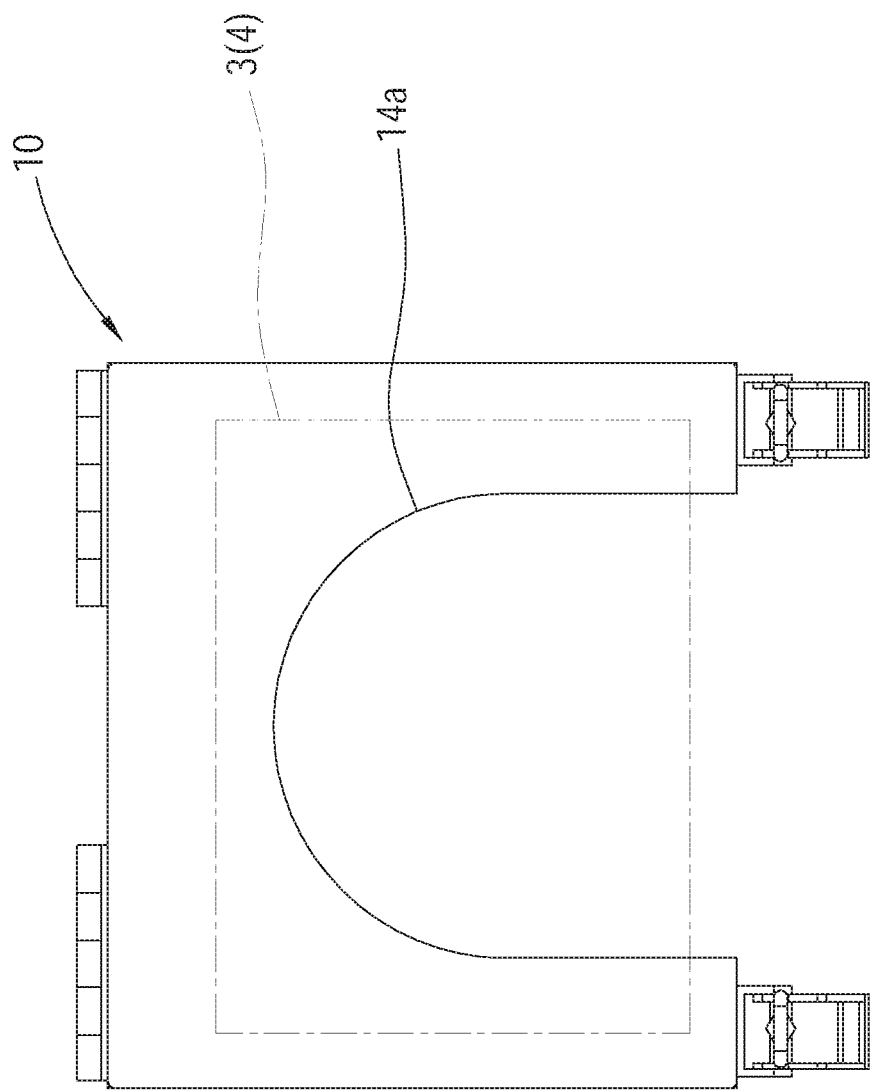
FIG. 5 is a top view, showing partial components of the apparatus of the first embodiment.

As shown in FIG. 3 and FIG. 5, the fixture 10 includes a first body 12 and a second body 14, wherein the second body 14 is pivotally connected to the first body 12. The second body 14 is operable to pivot between a first position P1 (as shown in FIG. 3) and a second position P2 (as shown in FIG. 4). When the second body 14 is located at the second position P2, a second surface 141 of the second body 14 abuts against a first surface 121 of the first body 12.

The first body 12 has a first notch 12a, and the second body 14 has a second notch 14a. When the second body is located at the second position P2, the first notch 12a communicates with the second notch 14a, and both a recess of the first notch 12a and a recess of the second notch 14a are recessed in the same direction.

As shown in FIG. 2, the fixing member 20 is adapted to support a last 1, and makes the last 1 facing the recesses of the first notch 12a and the second notch 14a.

Figure 9:
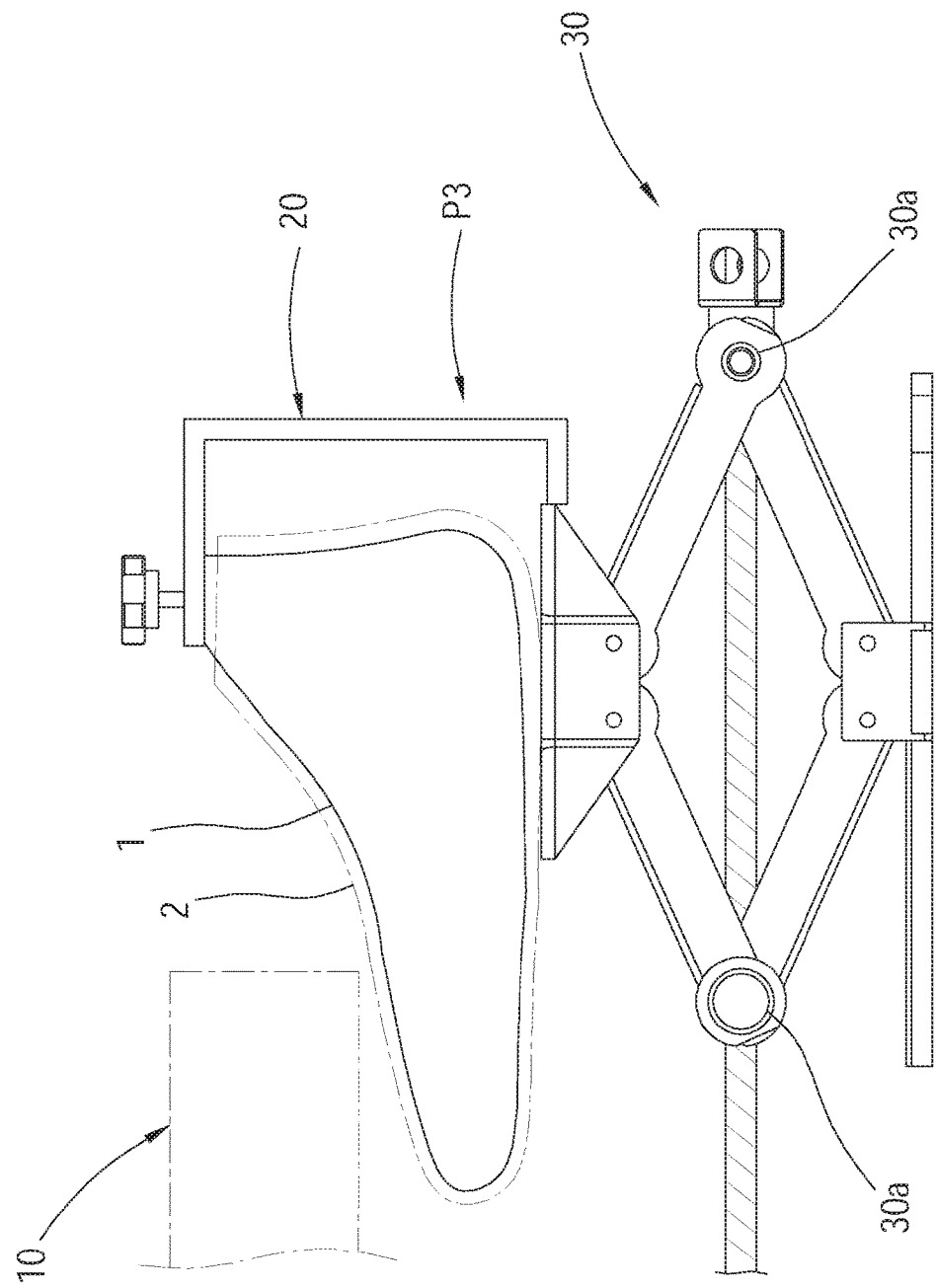
FIG. 9 is a side view, showing partial components of the apparatus of the first embodiment.
Figure 10:
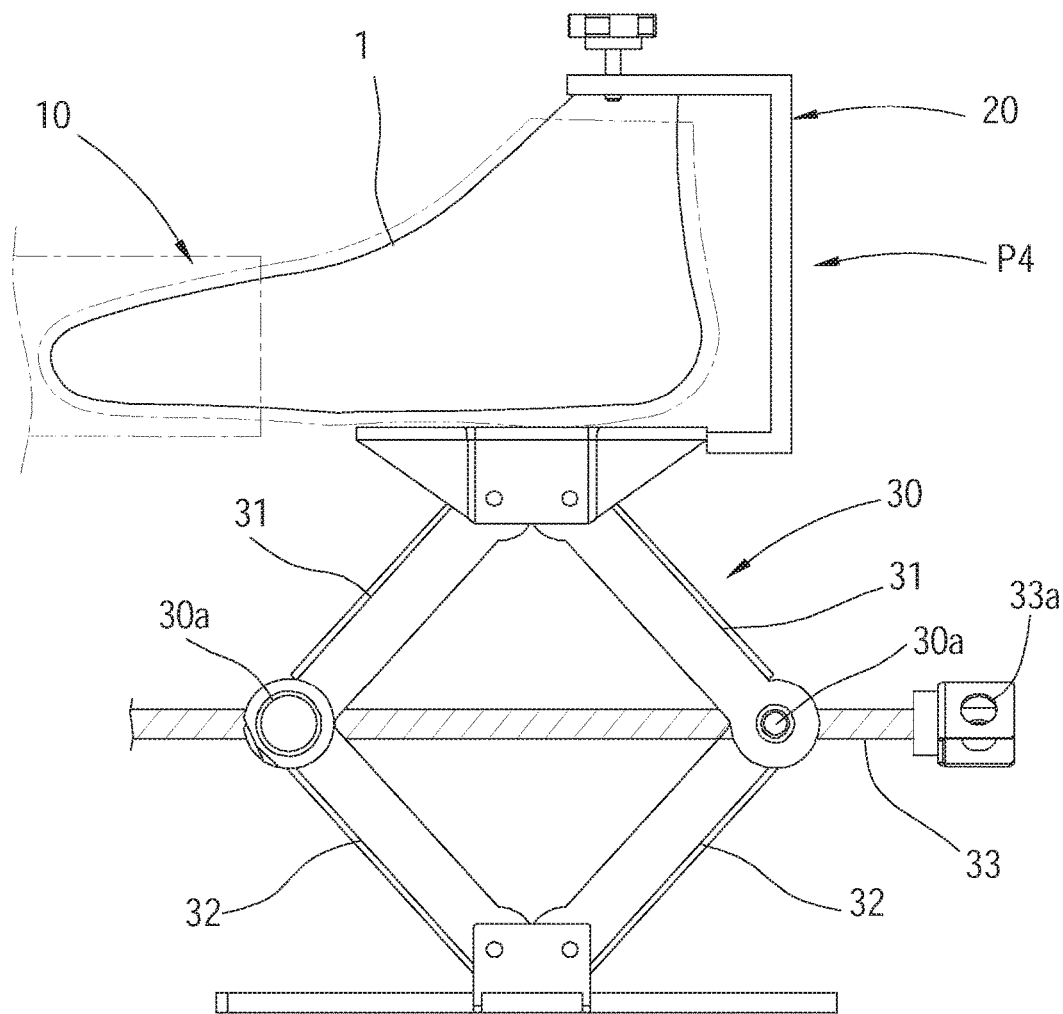
FIG. 10 is similar to FIG. 9.

The driving device 30 is adapted to drive the fixing member 20 to move toward the fixture 10 or vice versa. As shown in FIG. 9 and FIG. 10, in the current embodiment, the driving member 30 includes a pair of first struts 31, a pair of second struts 32, a screw (in order to illustrate easily, the screw is labeled a first screw 33), and a threaded insert (not shown) in conjunction with the first screw 33. An end of each of the first struts 31 is pivotally connected to the corresponding second strut 32, and another end thereof is connected to the fixing member 20. The threaded insert is disposed on a pivot 30a between one of the first struts 31 and the corresponding second strut 32. An end of the first screw 33 abuts against the fixture 10, whereby to position the first screw 33. However, the first screw 33 is not limited to be abutted against the fixture 10. The first screw 33 passes through the pivots 30a between the first struts 31 and the second struts 32, and is screwed into the threaded insert.

When the first screw 33 is operated to rotate, the threaded insert screwed into the first screw 33 moves relative to the first screw 33, so that the two pivots 30a relatively approach to or move apart from each other. As shown in FIG. 9, when the two pivots 30a move apart from each other, the fixing member 20 is located at a third position P3, so that the last 1 is located below the fixture 10. As shown in FIG. 10, when the two pivots 30a approach to each other, the fixing member 20 is located at a fourth position P4, so that the last 1 is located within the first notch 12a and the second notch 14a.

The contactless heating device 40 is disposed upon the second body 14 to be located in a vertically extending direction of the first notch 12a and the second notch 14a, wherein the contactless heating device 40 is operable to heat the first notch 12a and the second notch 14a.

In the aforementioned paragraphs, detailed components and the structures of the apparatus 100 of the first embodiment of the present invention are explained, while the operation thereof will be described in detail later.

The vamp 2 is fitted around the last 1, so that the vamp 2 maintains a specific shape and is fixed on the fixing member 20.

As shown in FIG. 3, the composite material film 3 and the tensile film 4 are sequentially overlapped on the first surface 121 of the first body 12, and cover the first notch 12a (i.e., the composite material film 3 is located below the tensile film 4). The second body 14 is operated to pivot from the first position P1 to the second position P2 to make the second surface 141 abut against the first surface 121, which fixes the tensile film 4 and the composite material film 3 along sidewall surface of the first notch 12a and the second notch 14a, as shown in FIG. 5.

The first screw 33 is operated to rotate, so that the last 1 which is fitted around by the vamp 2 moves from the third position P3 to the fourth position P4. Meanwhile, a part of the surface of the vamp 2 abuts against the composite material film 3, so that both of the tensile film 4 and the composite material film 3 have a predetermined tension and fit perfectly on the vamp 2.

In addition, a perforation 33a is disposed on one end of the first screw 33 to be passed through by an operating shaft (not shown). The first screw 33 could be rotated by operating the operating shaft, which could help the user to easily rotate the first screw 33.

The contactless heating device 40 is operated to face the composite material film 3, whereby to heat the composite material film 3 at the predetermined temperature for the predetermined time, so that the composite material film 3 is melted to be attached to the vamp 2. When the fixing member 20 is located at the fourth position P4, the vamp 2 pulls the tensile film 4, so that the tensile film 4 is stretched and has a smooth surface. Therefore, a surface of the melted composite material film 3 is pressed by the tensile film 4 to be flat, and is attached to the surface of the vamp 2 having a three-dimensional shape without wrinkles.

After that, the first screw 33 is rotated to move the fixing member 20 from the fourth position P4 to the third position P3, whereby to move the composite material film 3 away from the tensile film 4, so as to form the shoe body which has the protective layer formed by the composite material film 3.

In order to smoothly attach the composite material film 3 to the vamp 2, in the current embodiment, the apparatus 100 includes at least one pushing member 16, at least one elastic member 18, a locking device 50, and a holding device 60.

Figure 6A:
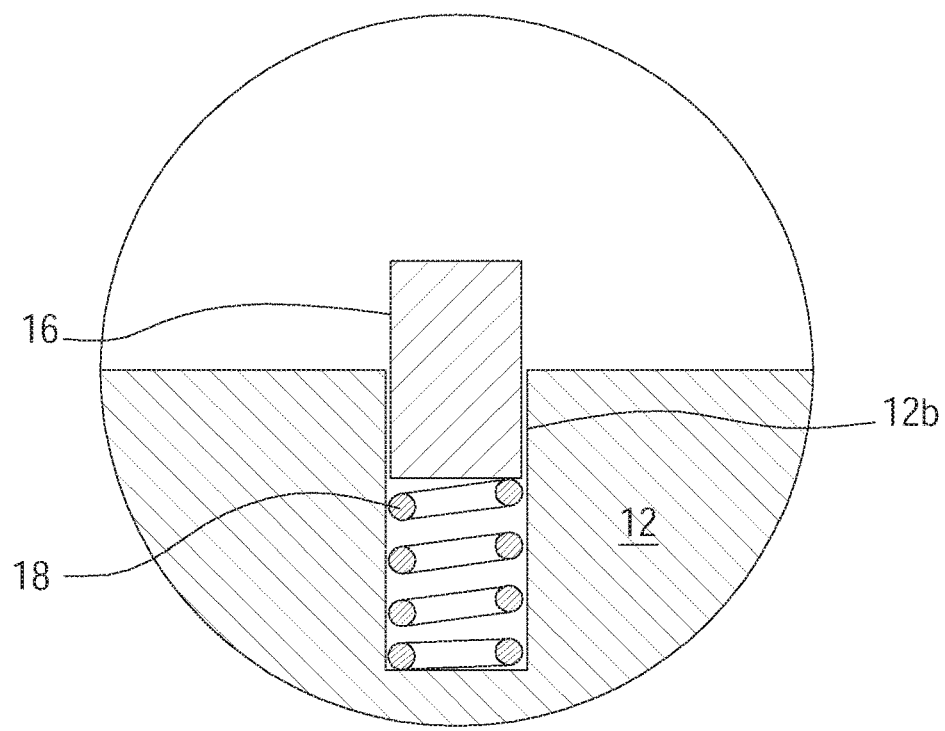
FIG. 6a is a sectional view, showing partial components of the apparatus of the first embodiment.
Figure 6B:
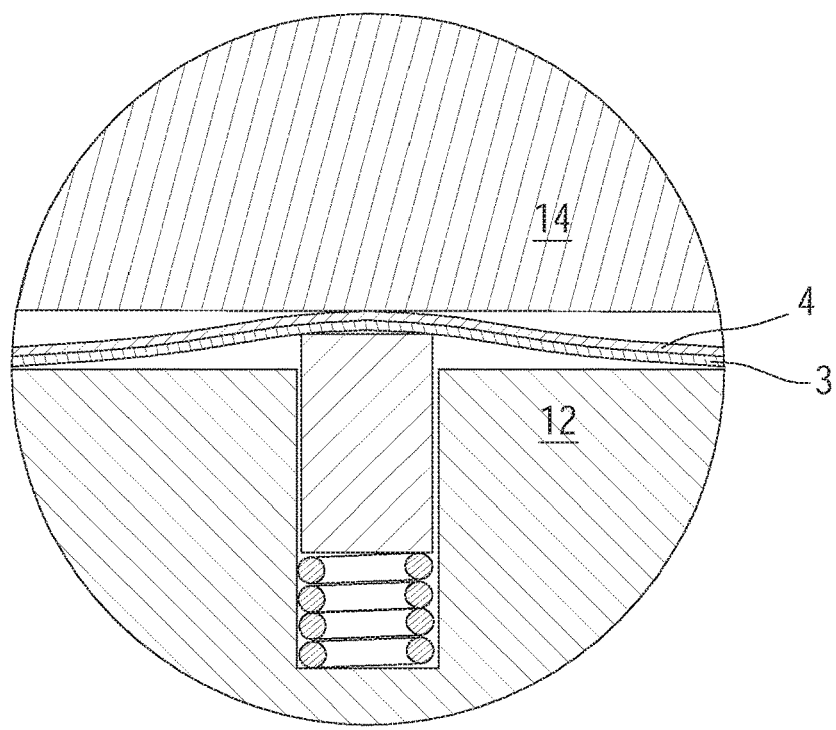

As shown in FIG. 3, FIG. 6a, and FIG. 6b, at least one receiving recess 12b is recessed into the first surface 121 of the first body 12, and the pushing member 16 and the elastic member 18 are disposed in the receiving recess 12b, wherein the elastic member 18 is located between a bottom of the receiving recess 12b and the pushing member 16, whereby to urge the pushing member 16 to move outward of the receiving recess 12b. In the current embodiment, a plurality of receiving recesses 12b are recessed into the first surface 121 of the first body 12, wherein the receiving recesses 12b which are placed by the pushing member 16 and the elastic member 18 could be adjusted according to the size and the shape of the tensile film 4 and the composite material film 3.

When the second body 14 is located at the second position P2, the pushing member 16 is pushed by the elastic member 18, whereby the composite material film 3 and the tensile film 4 tightly abut against the second surface 141 of the second body 14. Therefore, when the vamp 2 moves, the composite material film 3 and the tensile film 4 could not be easily displaced by being pulled, so that the composite material film 3 could maintain being attached to the vamp 2 tightly.

The locking device 50 is disposed on either the first body 12 or the second body 14, wherein the one without the locking device 50 is provided with a recess 14b, wherein such recess 14b is disposed opposite to the locking device 50. As shown in FIG. 3 and FIG. 4, in the current embodiment, the locking device 50 includes a positioning member 52, an operating member 54, and a ring 56, wherein the positioning member 52 is disposed on the first body 12; the operating member 54 is pivotally disposed on the positioning member 52; the ring 56 is pivotally disposed on the operating member 54; the second body 14 is provided with said recess 14b.

The ring 56 is operable to be fitted into the recess 14b. When the operating member 54 pivots in a direction away from the second body 14, the ring 56 is wedged in the recess 14b, so that the second surface 141 abuts against the first surface 121, whereby to fix the second body 14 on the first body 12, reducing the risk that the composite material film 3 and the tensile film 4 displaces relative to the first body 12 and the second body 14.

Figure 7:
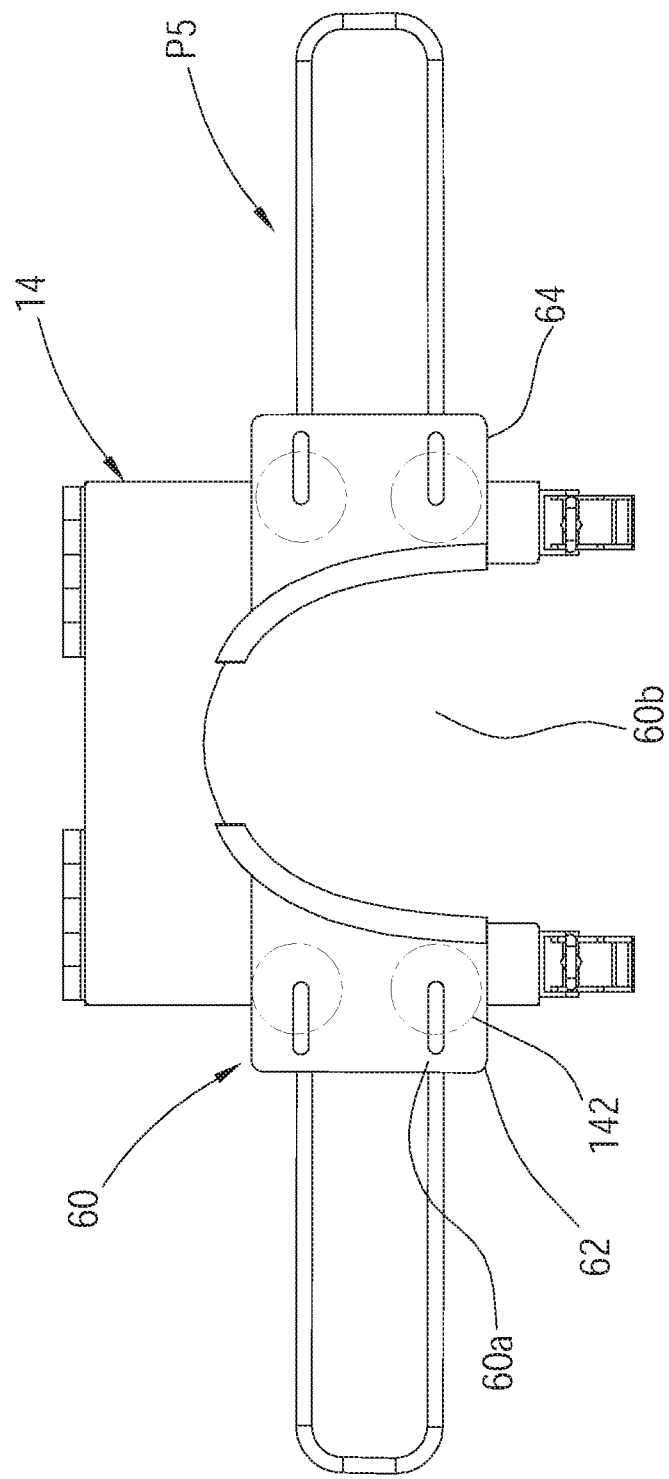
FIG. 7 is a top view, showing partial components of the apparatus of the first embodiment.
Figure 8:
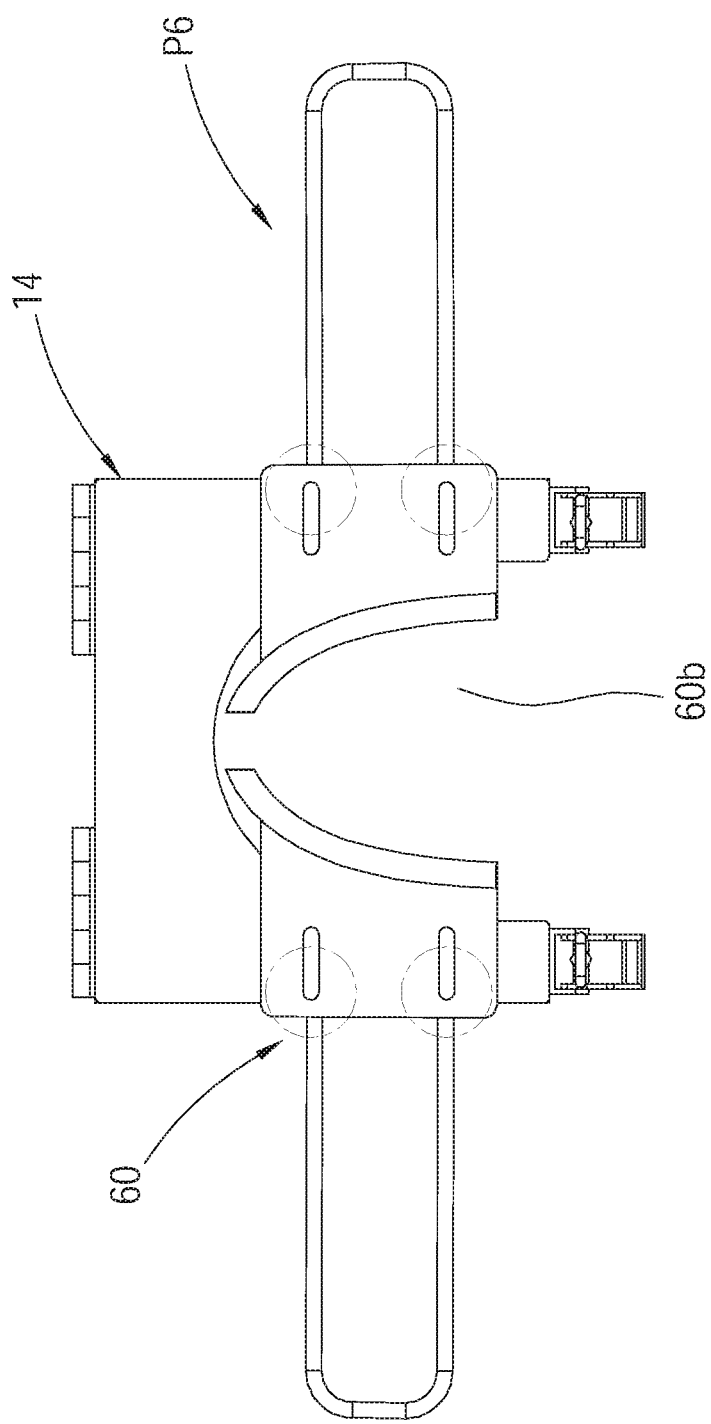
FIG. 8 is similar to FIG. 7.

As shown in FIG. 7 and FIG. 8, the holding device 60 is disposed on the first body 12 or the second body 14. In the current embodiment, the holding device 60 is disposed on the second body 14, and includes a left clamping member 62 and a right clamping member 64, wherein each of the left clamping member 62 and the right clamping member 64 have at least one slot 60a. At least two rods 143 are disposed on the second body 14, and a top of each of the rods 143 (not shown) is provided with a limiting member 142, wherein each of the rods 143 passes through the corresponding slot 60a, whereby to restrict the left clamping member 62 and the right clamping member 64 to be moved at a releasing position P5 and a holding position P6. The limiting members 142 could prevent the left clamping member 62 and the right clamping member 64 from being disengaged from the rods 143 to separate with the second body 14.

A third notch 60b is formed between the left clamping member 62 and the right clamping member 64, and communicates with the second notch 14a, wherein a recess of the third notch 60b and the recess of the second notch 14a are recessed in the same direction. The left clamping member 62 and the right clamping member 64 are operable to move between the releasing position P5 and the holding position P6 relative to the second body 14, whereby to change a width of the third notch 60b. When the left clamping member 62 and the right clamping member 64 are located at the holding position P6, two opposite edges of the tensile film 4 are clamped by the left clamping member 62 and the right clamping member 64, so that the third notch 60b could abut against the vamp 2 via the tensile film 4 and the composite material film 3. In this way, the composite material film 3 could be tightly attached to two lateral sides of the vamp 2.

For the convenience of operation, as shown in FIG. 2, in the current embodiment, the apparatus 100 further includes a frame 70, wherein the frame 70 has a base 72, a slide 74, and a movable plate 76, wherein the slide 74, the movable plate 76, and the fixture 10 are disposed on the base 72, and the fixture 10 is located between the slide 74 and the movable plate 76.

Figure 11:
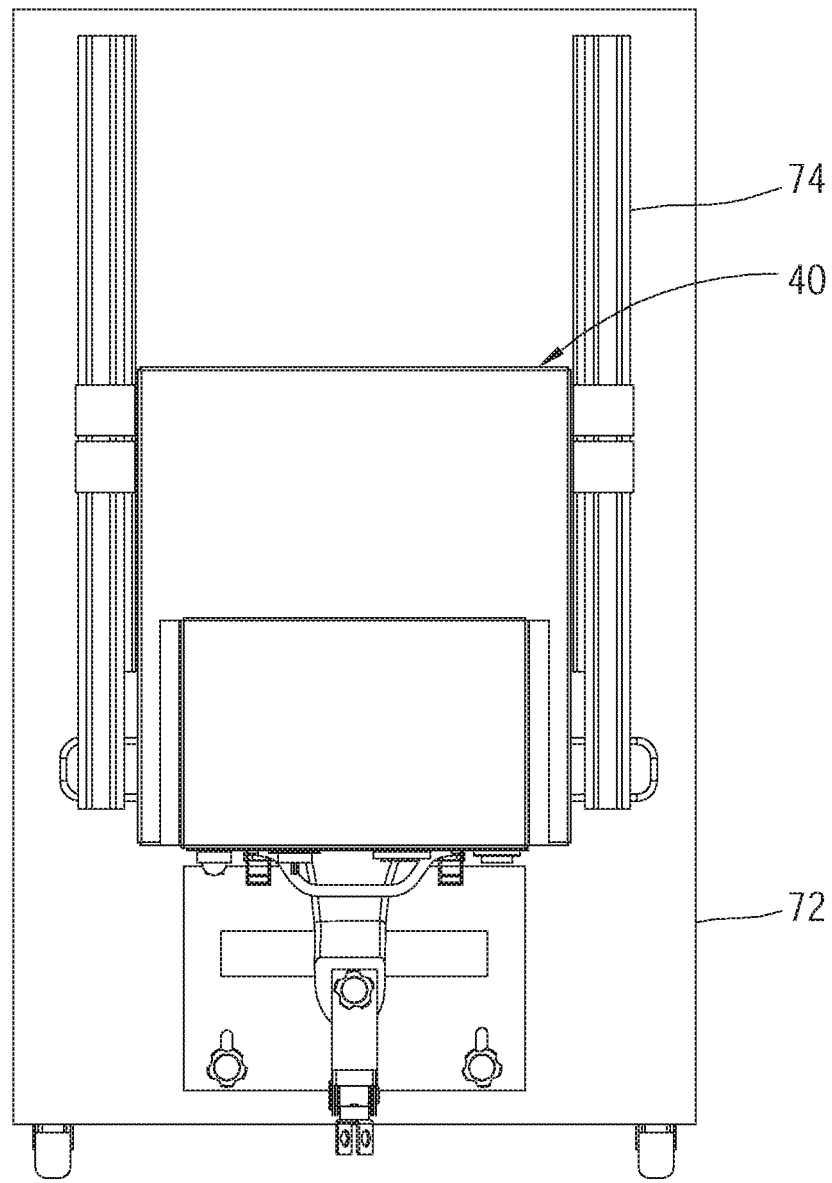
FIG. 11 is a top view, showing partial components of the apparatus of the first embodiment.
Figure 12:
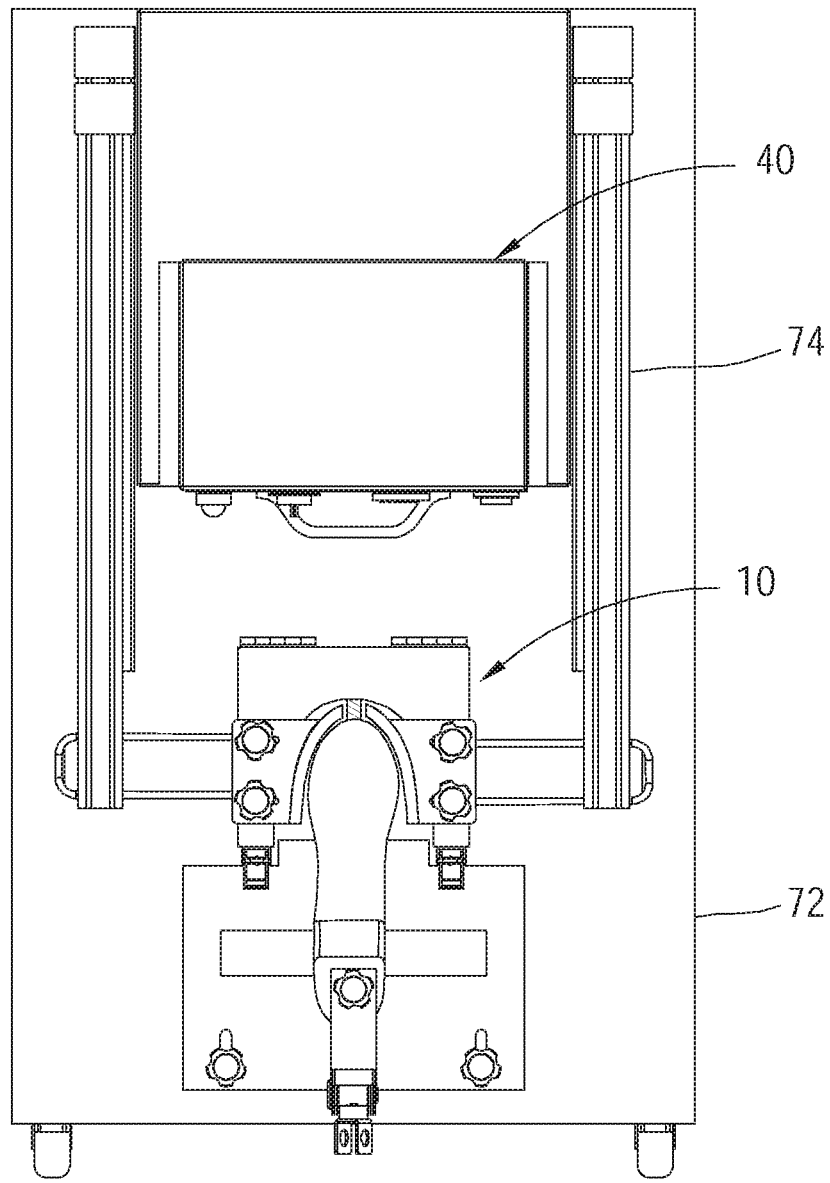
FIG. 12 is similar to FIG. 11.

The contactless heating device 40 is disposed on the slide 74 to be operable to move relative to the base 72, so that the contactless heating device 40 could be close to (as shown in FIG. 11) or away from (as shown in FIG. 12) the fixture 10. The driving device 30 is disposed on the movable plate 76, and the movable plate 76 is operable to move relative to the base 72, so that the fixing member 20 could be close to (as shown in FIG. 13) or away from (as shown in FIG. 14) the fixture 10.

Figure 13:
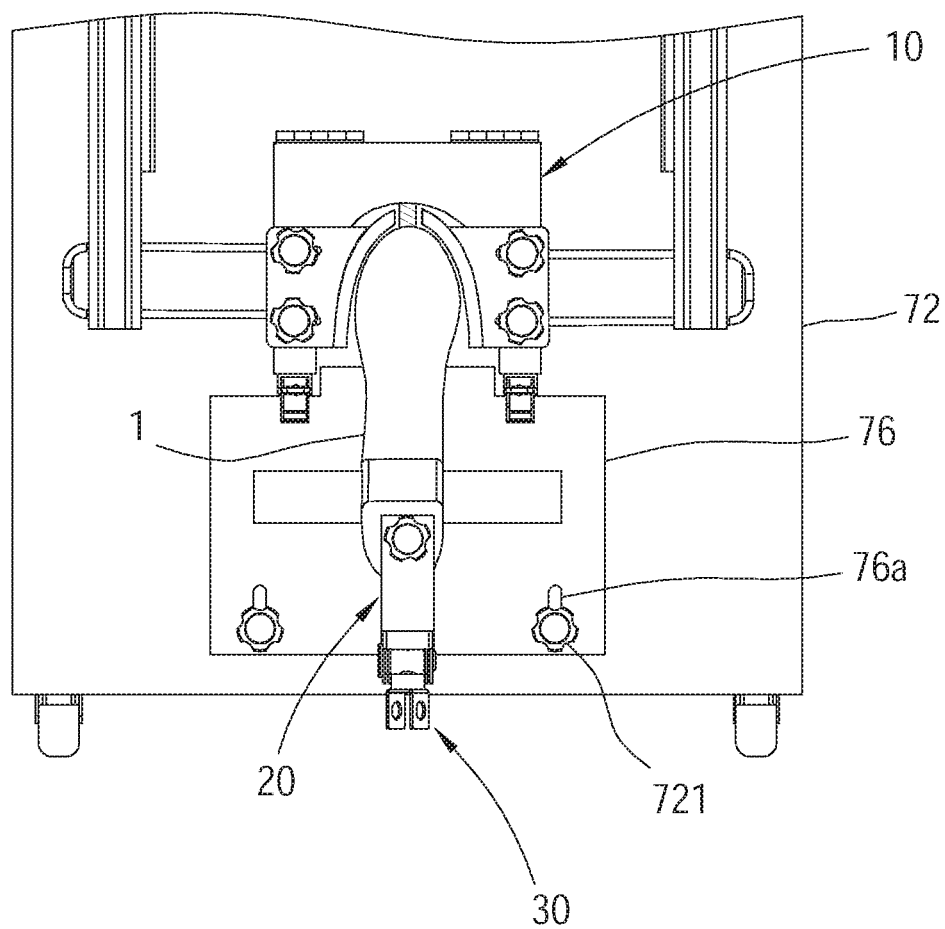
FIG. 13 is a top view, showing partial components of the apparatus of the first embodiment.
Figure 14:
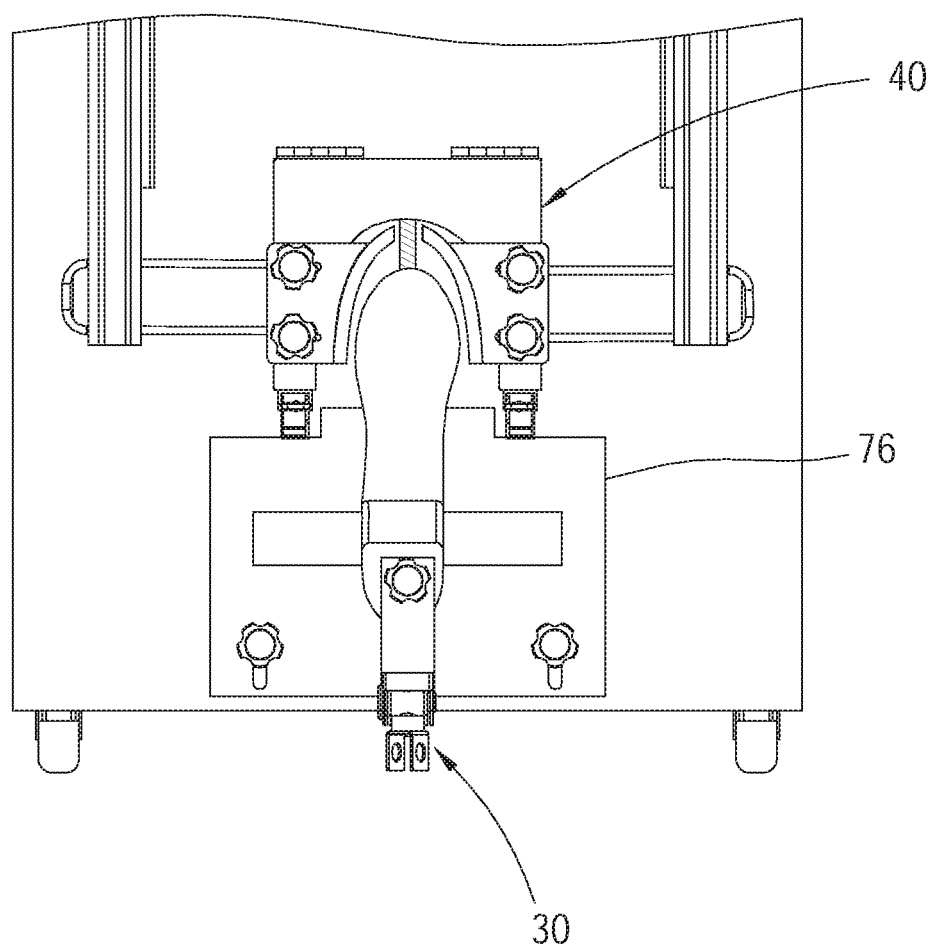
FIG. 14 is similar to FIG. 13.

The movable plate 76 is operable to move relative to the base 72, so that the last 1 and the fixing member 20 located on the movable plate 76 could be close to (as shown in FIG. 13) or away from (as shown in FIG. 14) the fixture 10. The movable plate 76 has at least one slot 76a, wherein a rod (not shown) passes through the slot 76a of the movable plate 76 to be engaged with the base 72, whereby to restrict the movement of the movable plate 76. A top of the rod passing through the slot 76a of the movable plate 76 is provided with a restricting member 721, whereby to prevent the movable plate 76 from being disengaged from the rod to separate with the base 72.

With the aforementioned design, the last 1 fitted around by the vamp 2 is fixed on the fixing member 20 first, then, the movable plate 76 is operated to move the driving device 30 and the vamp 2 to approach to the fixture 10, so as to prevent the fixture 10 from hindering the fixing of the last 1. Similarly, when the composite material film 3 is about to be heated, the contactless heating device 40 is operated to move close to the fixture 10 along the slide 74. After the heating is finished, the contactless heating device 40 could be operated to move away from the fixture 10, whereby to prevent the contactless heating device 40 from obstructing the view and hindering the subsequent operation.

An apparatus 200 of a second embodiment of the present invention for utilizing the method is illustrated in FIG. 15 to FIG. 19, which has almost the same structure as the apparatus 100 of the first embodiment, including the frame 70 and the holding device 60, and a fixture 10', a fixing member 20', and a contactless heating device 40' which are disposed on the base 72 of the frame 70, and a driving device 30' which is adapted to drive the fixing member 20'.

Figure 15:
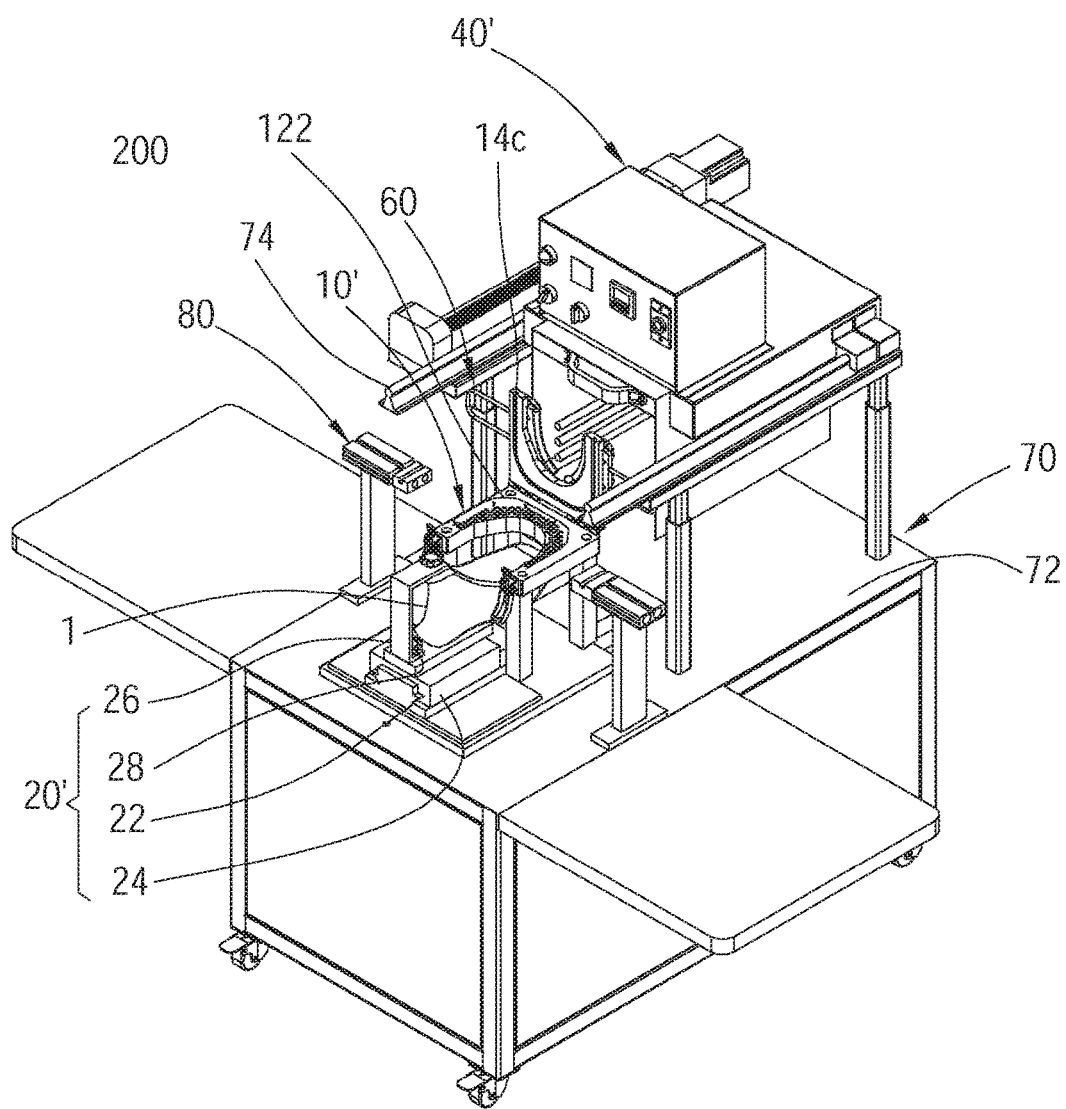
FIG. 15 is a perspective view of the apparatus for manufacturing a shoe body of a second embodiment of the present invention.

As shown in FIG. 15 to FIG. 17, the fixture 10' of the second embodiment has almost the same structure as the fixture 10 of the first embodiment, except that a groove 14c is recessed into the second surface of the fixture 10' along a peripheral edge of the second notch 14a. The first body 12 of the fixture 10' has a plurality of projections 122 projecting along a peripheral edge of the first notch 12a, wherein the projections 122 are located on the first surface 121 to be opposite to the groove 14c.

When the second surface 141 of the fixture 10' abuts against the first surface 121, a part of the composite material film 3 and a part of the tensile film 4 are located in the groove 14c, wherein the projections 122 and the bottom of the groove 14c abut against the composite material film 3 and the tensile film 4, whereby to provide a better positioning performance, so that the composite material film 3 and the tensile film 4 could not be easily displaced by being pulled.

As shown in FIG. 15, the second body 14 of the fixture 10' is provided with the holding device 60. The apparatus 200 further includes two cylinders 80 which are disposed on two lateral sides of the fixture 10'. As shown in FIG. 18, each of the cylinders 80 includes a piston rod 81, wherein the piston rods 81 is operable to reciprocate in a linear direction. Each of the piston rods 81 has a blocking groove 81a recessed into a top surface thereof.

When the second surface 141 of the fixture 10' abuts against the first surface 121, an end 66 of each of the left clamping member 62 and the right clamping member 64 of the holding device 60 (as shown in FIG. 7) which are away from the third notch 60b are respectively wedged into the corresponding blocking groove 81a. The left clamping member 62 and the right clamping member 64 of the holding device 60 could be driven by the cylinders 80 to move between the releasing position P5 and the holding position P6.

The fixing member 20' includes a seat 22, a block 24, a holding member 26, and a pivoting member 28, wherein one of the seat 22 and the block 24 has a tail socket of a dovetail, while the other one has a tail of the dovetail in conjunction with the tail socket. In the current embodiment, the seat 22 has the tail of the dovetail, and a bottom of the block 24 has the tail socket of the dovetail recessed therein. The holding member 26 is pivotally disposed on a top of the block 24 via the pivoting member 28.

The last 1 is disposed between the holding member 26 and the block 24, and a top of the last 1 is fixed by the holding member 26, and therefore, when the holding member 26 is operated to pivot relative to the block 24, the last 1 could pivot with the holding member 26. In this way, when a part of the surface of the vamp 2 abuts against the composite material film 3, the holding member 26 and the last 1 could pivot relative to the fixture 10' by operating the holding member 26, so that two lateral sides of a toe of the vamp 2 could abut against the composite material film 3, whereby the composite material film 3 could be completely attached to the vamp 2.

Figure 20:
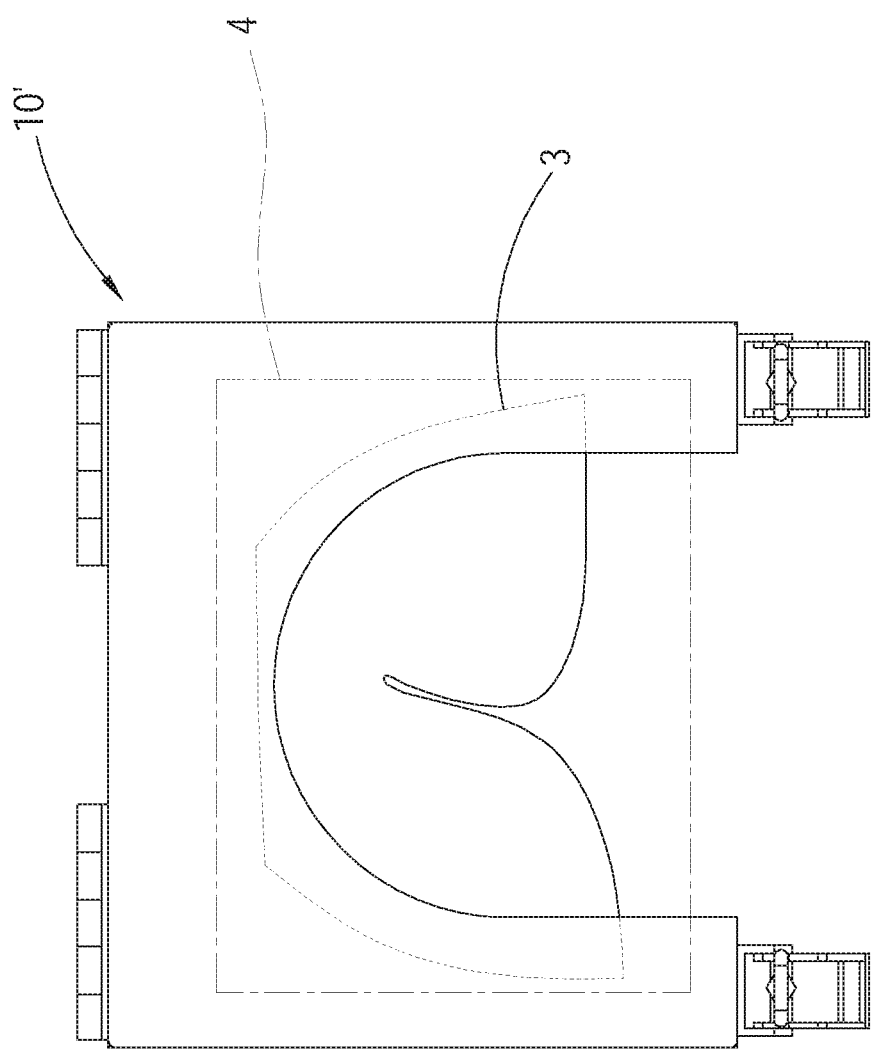
FIG. 20 is a top view, showing partial components of the apparatus of the second embodiment.
Figure 21:
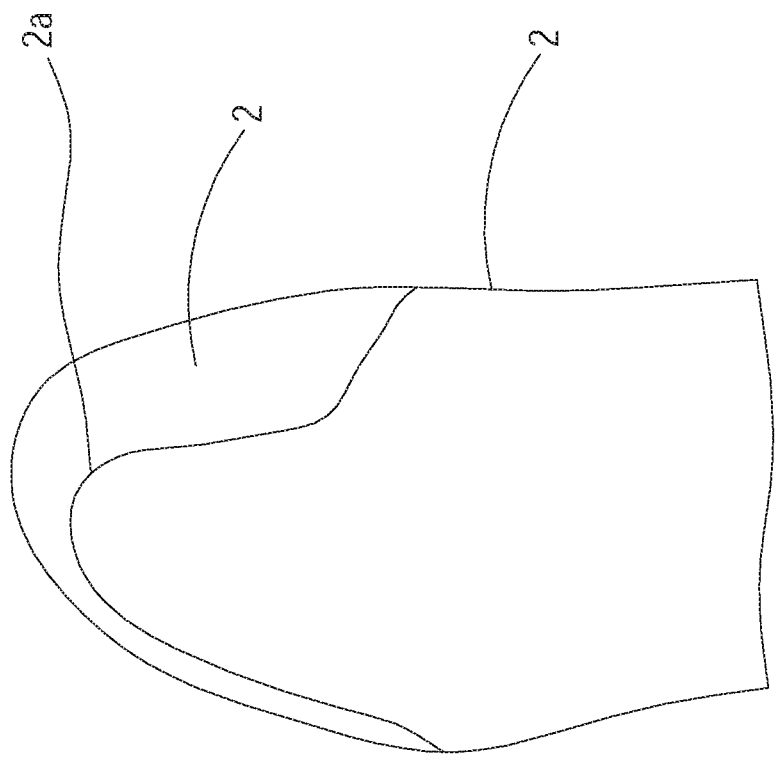
FIG. 21 is a schematic diagram, showing partial components of the apparatus of the second embodiment.

In addition, the position of the composite material film 3 being attached to the vamp 2 could be further adjusted to meet various requirements. As shown in FIG. 20 and FIG. 21, the composite material film 3 could be cut into a specific shape in advance, and a marking line 2a is made on the surface of the vamp 2. When the last 1 is operated to make a part of the surface of the vamp 2 abutting against the composite material film 3, the holding member 26 and the last 1 could be operated to pivot relative to the fixture 10', and an edge of the composite material film 3 is aligned with the marking line 2a at the same time, whereby to adjust the position of the composite material film 3 being attached to the vamp 2, and to adjust the shape of the composite material film 3.

Figure 16A:
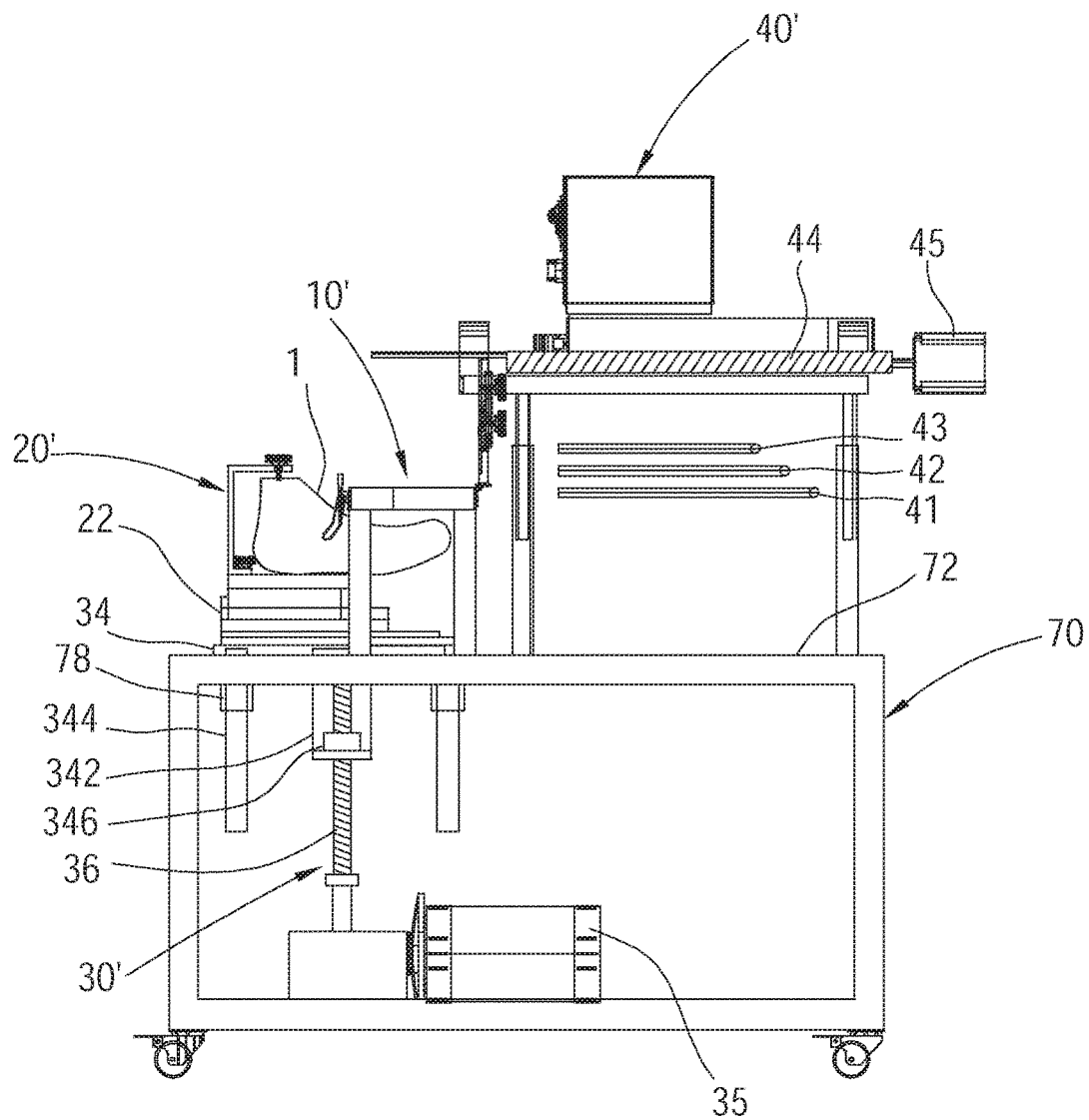
FIG. 16a is a side view, showing partial components of the apparatus of the second embodiment.
Figure 16B:
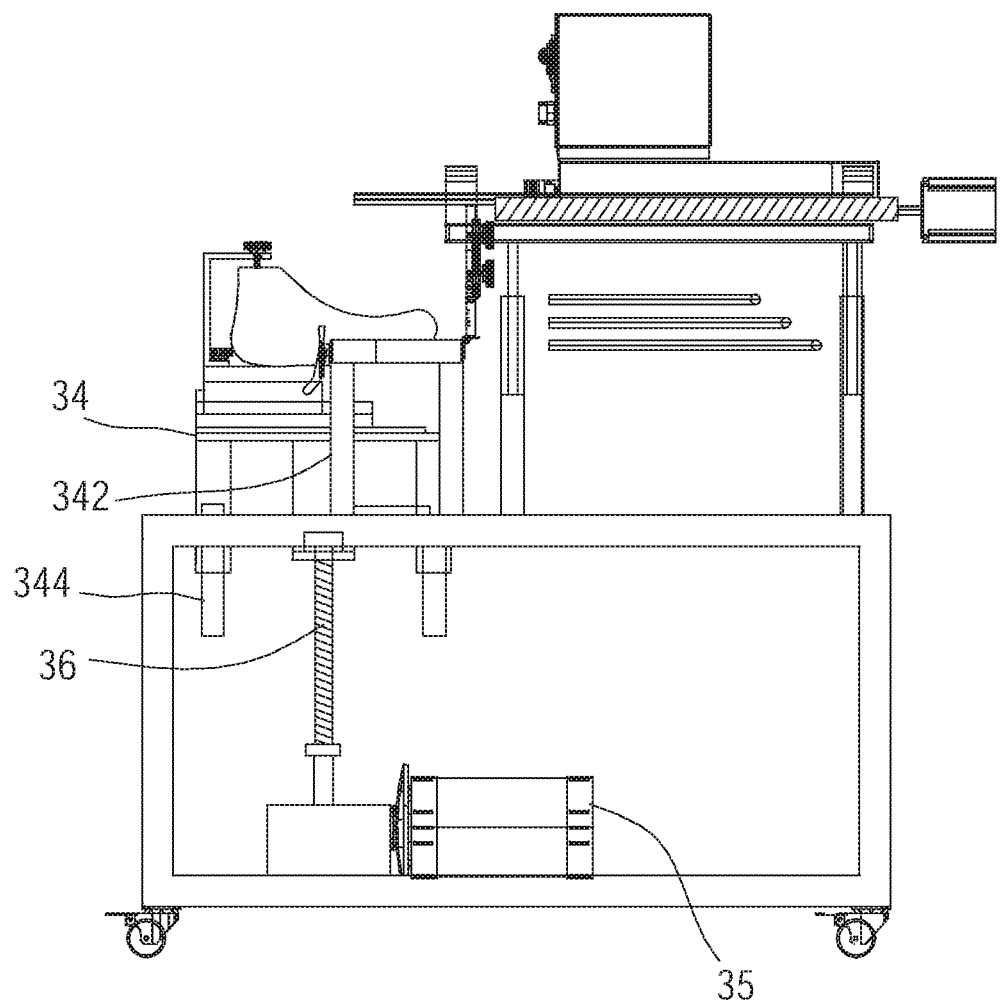

As shown in FIG. 16a and FIG. 16b, the driving device 30' includes a moving plate 34, a motor 35, and a screw (in order to illustrate easily, the screw is labeled a second screw 36), wherein the moving plate 34 is adapted to support the seat 22 of the fixing member 20'. A first sleeve 342 is disposed on a bottom of the moving plate 34, wherein a threaded insert 346 is disposed inside of the first sleeve 342, so that the first sleeve 342 fits around the second screw 36 via the threaded insert 346.

The motor 35 drives the second screw 36 to rotate, whereby to drive the moving plate 34 to move in a linear direction, so that the last 1 fixed on the fixing member 20' could be moved into or away from the first notch 12a of the first body 12 of the fixture 10'.

In order to keep balance without shaking while moving the moving plate 34, the base 72 has at least one through hole (not shown), and a second sleeve 78 communicating with the through hole is disposed on a bottom of the base 72. At least one guiding shaft 344 is disposed on the bottom of the moving plate 34, and passes through the corresponding through hole and the second sleeve 78.

The contactless heating device 40' includes a plurality of infrared lamps 41, 42, 43 disposed on a periphery of the last 1, wherein the infrared lamps 41, 42, 43 are arc-shaped. As shown in FIG. 16a and FIG. 19, cope with the shape of the last 1 that the bottom of the last 1 is wider and the top of the last 1 is narrower, the area enclosed by one of the infrared lamps 41, 42, 43 close to the bottom of the last 1, which is define as a lower infrared lamp 41, is greater; the area enclosed by one of the infrared lamps 41, 42, 43 close to the top of the last 1, which is defined as an upper infrared lamp 43, is smaller; the size of the area enclosed by one of the infrared lamps 41, 42, 43 close to the middle of the last 1 (i.e., the infrared lamp 42) is between the area enclosed by the infrared lamp 41 and the area enclosed by the infrared lamp 43. With the difference of the area surrounded by different infrared lamps 41, 42, 43, the distance between each of the infrared lamps 41, 42, 43 and the last 1 could be maintained, whereby to uniformly heat the composite material film 3 which is attached to the vamp 2 having a three-dimensional shape.

In addition, the contactless heating device 40' further includes a threaded insert (not shown) which fits around a screw (in order to illustrate easily, the screw is labeled a third screw 44), wherein the third screw 44 is disposed parallel to the slide 74, and is driven to rotate by a motor 45, so that the contactless heating device 40' could move in a linear direction along the third screw 44 and the slide 74.

Figure 22:
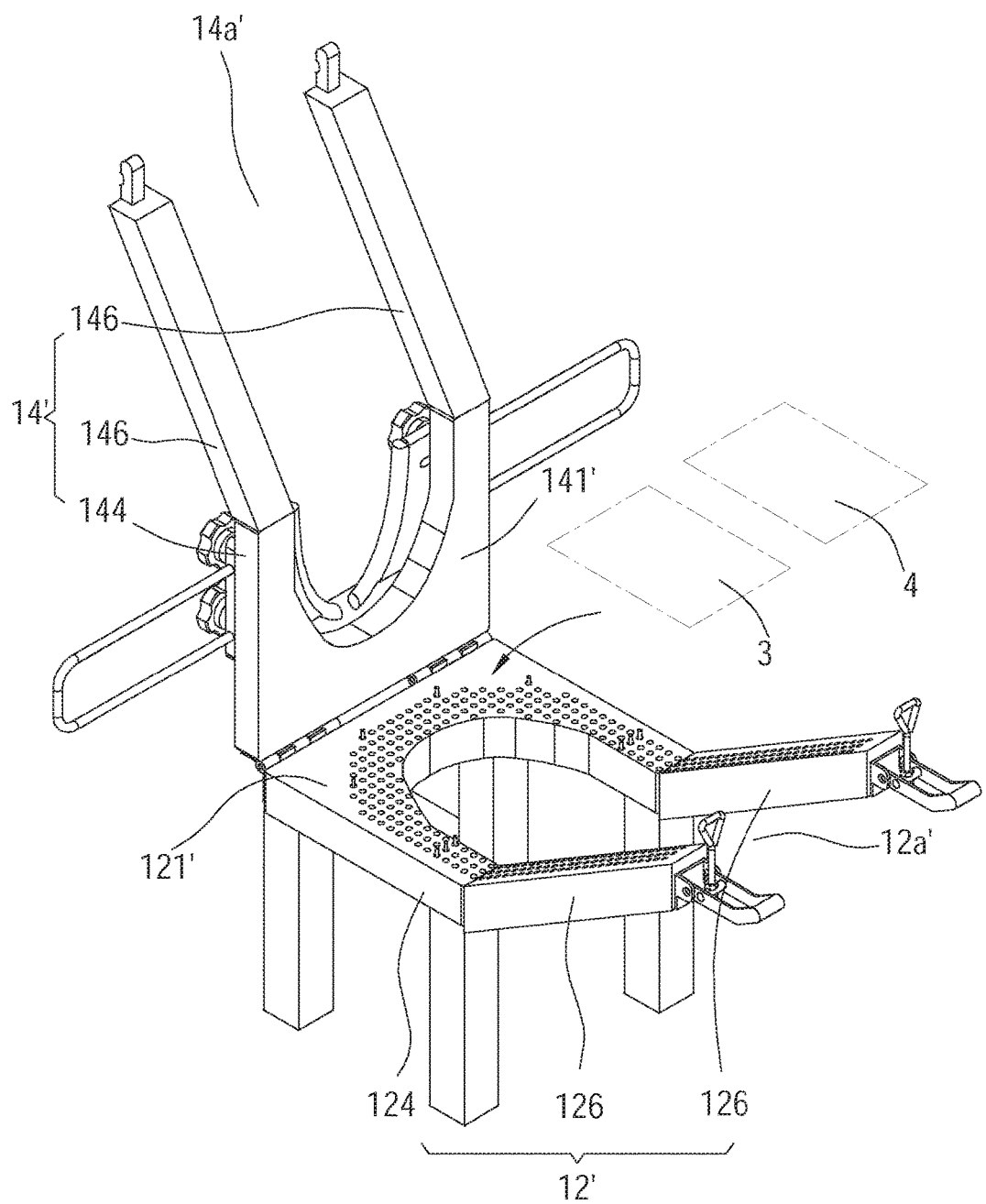
FIG. 22 is a perspective view of the apparatus for manufacturing a shoe body of a third embodiment of the present invention.
Figure 23:
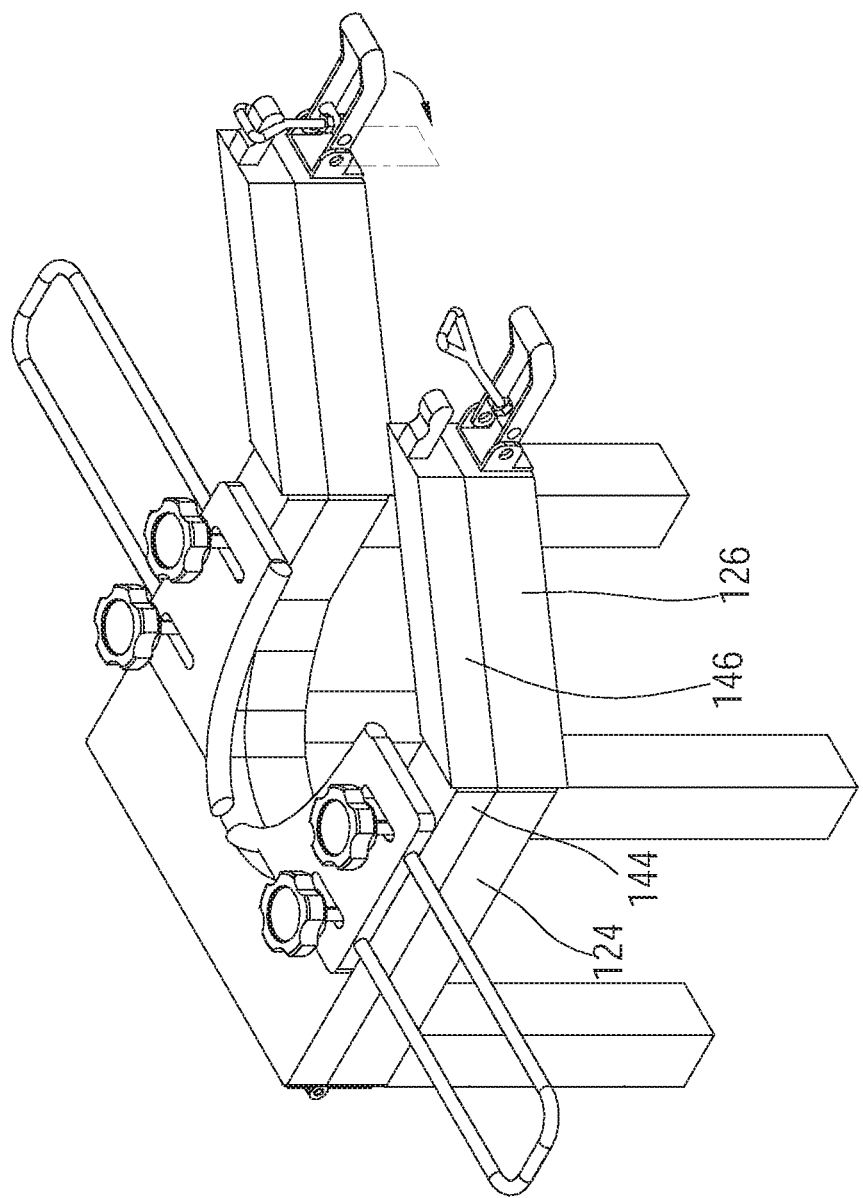
FIG. 23 is similar to FIG. 22.

In order to make the protective layer cover a wider area, an apparatus of a third embodiment of the present invention for utilizing the method is illustrated in FIG. 22 and FIG. 23, which has almost the same structure as the apparatus 200 of the second embodiment, except that a first body 12' includes a first portion 124 and two second portions 126; a second body 14' includes a first portion 144 and two second portions 146, wherein an obtuse angle is formed between the first portion 124 and each of the second portions 126 of the first body 12'; an obtuse angle is formed between the first portion 144 and each of the second portions 146 of the second body 14'.

In the current embodiment, the first portion 124 of the first body 12' has a bottom of a first notch 12a', and the second portions 126 of the first body 12' form an inner wall of the first notch 12a'; the first portion 144 of the second body 14' has a bottom of a second notch 14a', and the second portions 146 of the second body 14' form an inner wall of the second notch 14a'.

In the current embodiment, when a first surface 121' abuts against a second surface 141', the first portion 124 of the first body 12' is opposite to the first portions 144 of the second body 14', and the second portions 126 of the first body 12' is opposite to the second portions 146 of the second body 14'. In this way, when the vamp 2 moves to the first notch 12a' and the second notch 14a', the composite material film 3 could not only cover the toe of the vamp 2 but also extend to cover a counter of the vamp 2.

By fixing at least two opposite lateral edges or two adjacent lateral edges of both the tensile film 4 and the composite material film 3, when the surface of the vamp 2 abuts against the composite material film 3, both of the tensile film 4 and the composite material film 3 have a predetermined tension. Therefore, when the composite material film 3 is heated, the tensile film 4 maintains the composite material film 3 to fit perfectly on the vamp 2 having a three-dimensional shape, reducing the wrinkles.

It must be pointed out that the embodiments described above are only some preferred embodiments of the present invention. All equivalent structures and methods which employ the concepts disclosed in this specification and the appended claims should fall within the scope of the present invention.

What is claimed is:

1. A method for manufacturing a shoe body, wherein the shoe body is a part of a shoe and is adapted to be combined with a sole to form the shoe; the shoe body has a vamp having a three-dimensional shape and a protective layer which is adhered to at least a part of a surface of the vamp; the protective layer is made of composite material which is different from a material of the vamp; the method is adapted to adhere the protective layer on the vamp, comprising steps of:
   A. preparing a tensile film and a composite material film, wherein the tensile film is extensible;
   B. overlapping the tensile film and the composite material film, and fixing at least two opposite lateral edges or two adjacent lateral edges of both the tensile film and the composite material film at the same time;
   C. moving the vamp to press the composite material film with at least part of the surface of the vamp, alternatively, moving the tensile film and the composite material film which are overlapped in step B to press at least part of the surface of the vamp with the composite material film, so that both of the tensile film and the composite material film have a predetermined tension;
   D. heating the composite material film in a contactless manner at a predetermined temperature for a predetermined time, so that the composite material film is joined to at least part of the surface of the vamp; and
   E. moving the tensile film away from the composite material film.

2. The method of claim 1, wherein after step C, further comprising a step of making the tensile film and the composite material film to be tightly fitted against the two opposite lateral sides or the two adjacent lateral sides of the vamp.

3. The method of claim 1, wherein, in step D, heating the composite material film by electric heating, by roasting, or by infrared ray irradiation.

4. An apparatus for utilizing the method of claim 1, comprising:

a fixture comprising a first body and a second body, wherein the first body has a first surface, and the second body has a second surface; the first body and the second body are operable to make the first surface abutting against the second surface, whereby to fix at least two opposite lateral edges or at least two adjacent lateral edges of both of the tensile film and the composite material film;

a fixing member, which is adapted to support the vamp;

a driving device, which is adapted to drive the fixing member or the fixture, whereby to make at least a part of the surface of the vamp abutting against the composite material film, alternatively, to make the composite material film abutting against at least a part of the surface of the vamp; and a contactless heating device, which is adapted to heat the composite material film.

5. The apparatus of claim 4, further comprising a locking device disposed on either the first body or the second body, whereby to maintain the first surface abutting against the second surface.

6. The apparatus of claim 5, wherein a recess is provided on the first body or the second body which is not provided with the locking device; the recess is disposed opposite to the locking device; the locking device comprises a positioning member, an operating member, and a ring, wherein the positioning member is disposed on either the first body or the second body; the operating member is pivotally disposed on the positioning member; the ring is pivotally disposed on the operating member and is operable to be fitted into the recess.

7. The apparatus of claim 4, further comprising at least one pushing member and at least one elastic member; a receiving recess is recessed into the first surface of the first body, wherein the at least one elastic member and the at least one pushing member are disposed in the receiving recess; the at least one elastic member is located between a bottom of the receiving recess and the at least one pushing member, whereby to urge the at least one pushing member moves outward of the receiving recess.

8. The apparatus of claim 4, wherein a groove is recessed into either the first surface of the first body or the second surface of the second body, while the other one is provided with at least one projection; the groove is in conjunction with the at least one projection; the at least one projection and a bottom of the groove abut against the composite material film and the tensile film.

9. The apparatus of claim 4, further comprising a holding device disposed on the first body or the second body, wherein the holding device comprises a left clamping member and a right clamping member; the left clamping member and the right clamping member are operable to move relative to the first body or the second body, so as to clamp the at least two opposite lateral edges or the at least two adjacent lateral edges of the tensile film.

10. The apparatus of claim 9, wherein the first body has a first notch, and the second body has a second notch; a third notch is formed between the left clamping member and the right clamping member, and the left clamping member and the right clamping member are operable to change a width of the third notch, whereby to make a sidewall surface of the third notch abutting against the tensile film; the first notch, the second notch, and the third notch communicate with one another when the first surface abuts against the second surface; a recess of the first notch, a recess of the second notch, and a recess of the third notch are recessed in the same direction.

11. The apparatus of claim 9, wherein each of the left clamping member and the right clamping member has at least one slot; the first body or the second body which is provided with the holding device includes at least two rods protruding thereon, and each of the at least two rods passes through the corresponding slot.

12. The apparatus of claim 9, further comprising two pushing devices disposed on two lateral sides of the fixture, wherein the two pushing devices respectively drive the left clamping member and the right clamping member to clamp the tensile film.

13. The apparatus of claim 4, further comprising a base and a movable plate disposed on the base, wherein the fixture or the fixing member which is not driven by the driving device is disposed on the base, while the other one is disposed on the driving device; the driving device is disposed on the movable plate; the movable plate is operable to move relative to the base, so that the fixing member is moved close to the fixture, alternatively, the fixture is moved close to the fixing member.

14. The apparatus of claim 4, wherein the driving device comprises a pair of first struts, a pair of second struts, a screw, and a threaded insert which is in conjunction with the screw; an end of each of the first struts is pivotally connected to the corresponding second strut, and another end of each of the first struts is connected to the fixture or the fixing member; the threaded insert is disposed on one of a plurality of pivots between one of the first struts and the corresponding second strut; the screw passes through the pivots between the first struts and the second struts, and is screwed into the threaded insert, wherein the screw is operable to move the pivots relatively approaching to or moving apart from each other.

15. The apparatus of claim 4, further comprising a base, wherein the driving device comprises a movable plate, a first sleeve, a motor, and a screw; the fixture or the fixing member which is not driven by the driving device is disposed on the base, while the other one is disposed on the movable plate; the first sleeve is disposed on the movable plate, a threaded insert which is in conjunction with the screw is disposed inside the first sleeve; the screw is driven to rotate by the motor, whereby to drive the first sleeve, so that the movable plate moves approaching to or away from the base.

16. The apparatus of claim 15, further comprising at least one second sleeve on a bottom of the base, wherein the base has at least one through hole communicating with the at least one second sleeve; the driving device comprises at least one guiding shaft disposed on a bottom of the movable plate, and the at least one guiding shaft passes through the corresponding through hole and the corresponding second sleeve.

17. The apparatus of claim 4, further comprising a base and a slide disposed on the base, wherein the fixture is disposed on the base; the contactless heating device is disposed on the slide and is operable to move relative to the base, so that the contactless heating device moves approaching to or away from the fixture.

18. The apparatus of claim 17, further comprising a motor and a screw which is driven to rotate by the motor, wherein the screw is disposed parallel to the slide; the contactless heating device comprises a threaded insert in conjunction with the screw.

19. The apparatus of claim 4, wherein the contactless heating device comprises an upper infrared lamp and a lower infrared lamp disposed on a periphery of the vamp; the upper infrared lamp is disposed on a top side of the lower infrared lamp; an area enclosed by the upper infrared lamp is smaller than an area enclosed by the lower infrared lamp.

20. The apparatus of claim 4, further comprising a base, which is adapted to support the fixture, wherein the fixing member comprises a seat and a block in conjunction with the seat; the seat is disposed on the base; the block is adapted to support the vamp and is operable to move relative to the seat, so as to move approaching to or away from the fixture.

\* \* \* \* \*